(12) United States Patent
Koike et al.

(10) Patent No.: US 7,452,918 B2
(45) Date of Patent: *Nov. 18, 2008

(54) RECYCLED PLASTIC MATERIAL, ELECTRONIC APPARATUS HAVING THE RECYCLED PLASTIC MATERIAL, METHOD OF MANUFACTURING PLASTIC PART, METHOD OF MANUFACTURING THE RECYCLED PLASTIC MATERIAL, AND METHOD OF REUSING PLASTIC MATERIAL

(75) Inventors: Yasushi Koike, Kanagawa-ken (JP); Shoji Akino, Kanagawa-ken (JP); Osamu Asakura, Kanagawa-ken (JP); Mizuko Matsumoto, Kanagawa-ken (JP); Takeshi Bungo, Tokyo (JP); Hirohide Matsuhisa, Kanagawa-ken (JP); Takeshi Iwasaki, Kanagawa-ken (JP); Izumi Uraki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

This patent is subject to a terminal disclaimer.

(21) Appl. No.: 10/968,021

(22) Filed: Oct. 20, 2004

(65) Prior Publication Data

US 2005/0051919 A1 Mar. 10, 2005

Related U.S. Application Data

(62) Division of application No. 09/564,501, filed on May 4, 2000, now Pat. No. 6,864,294.

(30) Foreign Application Priority Data

May 14, 1999 (JP) ............... 11-134867
Apr. 18, 2000 (JP) ............... 2000-116965

(51) Int. Cl.
*C08J 11/04* (2006.01)

(52) U.S. Cl. ............ 521/40; 521/40.5; 521/47; 521/48; 521/49

(58) Field of Classification Search ............... 521/40, 521/40.5, 47, 48, 49
See application file for complete search history.

(56) References Cited

U.S. PATENT DOCUMENTS

| 4,809,854 A | 3/1989 | Tomaszek | 209/3 |
|---|---|---|---|
| 5,236,603 A | 8/1993 | Sampson | 210/770 |
| 5,375,778 A | 12/1994 | Lundquist | 24/24 |
| 5,539,004 A * | 7/1996 | Ikeda et al. | 521/45 |
| 5,695,133 A | 12/1997 | Morse, Jr. et al. | 241/42 |
| 5,759,465 A | 6/1998 | Ha | 264/141 |
| 5,894,039 A | 4/1999 | Tsai et al. | 427/555 |
| 5,961,054 A | 10/1999 | Nishibori | 241/19 |
| 6,864,294 B2 * | 3/2005 | Koike et al. | 521/40 |

FOREIGN PATENT DOCUMENTS

| DE | 41 00 346 | 7/1992 |
|---|---|---|
| DE | 196 43 603 | 4/1998 |
| DE | 197 58 083 | 7/1999 |
| GB | 2 246 099 | 1/1992 |
| GB | 2 315 488 | 2/1998 |
| JP | 59-110460 | 6/1984 |
| JP | 3-79681 | 4/1991 |
| JP | 5-301222 | 11/1993 |
| JP | 7-323560 | 12/1995 |
| JP | 2513106 | 7/1996 |
| JP | 62-59663 | 3/1997 |
| JP | 2000-198116 | 7/2000 |
| WO | WO 98/03318 | 1/1998 |

OTHER PUBLICATIONS

"Current and Future Problems in Resource Recycling of BJ Printer", Electronic Packaging Technology, vol. 15, No. 9, pp. 55-59 (Sep. 1999).

* cited by examiner

*Primary Examiner*—Edward J Cain
(74) *Attorney, Agent, or Firm*—Fitzpatrick, Cella, Harper & Scinto

(57) ABSTRACT

A recycled plastic material is made from laser-engraved thermoplastic, metal-containing thermoplastic, thermoplastic used in an inkjet apparatus, or thermoplastic to which an ink or its composition have stuck. This recycled plastic material is manufactured by pulverizing any of these thermoplastics, cleaning the pulverized thermoplastic, removing a cleaning solution from the cleaned thermoplastic to dry it, and removing the dried thermoplastic solid matter other than the thermoplastic.

7 Claims, 17 Drawing Sheets

FIG. 13

| TEST ITEMS | | TEST CONDITIONS | UNIT | $R_v$ | $R_1$ | $S_1$ | $C_1$ |
|---|---|---|---|---|---|---|---|
| IZOD IMPACT STRENGTH | | ASTM-D256 COMPLYING WITH | J/m | 156.8 | 147 | 137.2 | 97.1 |
| ROCKWELL HARDNESS | | ASTM-D785 COMPLYING WITH | | 110 | 110 | 111 | |
| MFR | | JIS-K7210 COMPLYING WITH | g/10min. | 48.8 | 47.4 | 49.1 | 53.7 |
| COLOR DIFFERENCE | $\Delta Eab^*$ | CALCULATE BY COLOR DIFFERENCE EXPRESSION BASED ON JIS-K7105 FROM TRISTIMULUS VALUES OBTAINED IN ACCORDANCE WITH JIS-Z8722 CONDITION D | | REFERENCE | 0.17 | 0.88 | 1.03 |
| | $\Delta L^*$ | | | | -0.02 | -0.37 | |
| | $\Delta a^*$ | | | | 0.01 | -0.06 | |
| | $\Delta b^*$ | | | | 0.17 | 0.79 | |
| RESIDUAL MOISTURE CONTENT | | GRAVIMETRIC METHOD | WT% | | 0.11 | 0.11 | 0.55 |

FIG. 14

| TEST ITEMS | TEST CONDITIONS | UNIT | R₂ | S₂ | S₃ | C₂ |
|---|---|---|---|---|---|---|
| IZOD IMPACT STRENGTH | ASTM-D256 COMPLYING WITH | J/m | 90.2 | 89.2 | 87.2 | 66.6 |
| MFR | ASTM-D1238 COMPLYING WITH | g/10min. | 44.0 | 42.0 | 43.0 | 56.0 |
| COLOR DIFFERENCE (ΔE) | JIS-Z8722 COMPLYING WITH | | REFERENCE | 0.43 | 0.49 | 0.60 |
| RESIDUAL MOISTURE CONTENT | GRAVIMETRIC METHOD | WT% | | 0.10 | 0.15 | 0.25 |
| RESIDUAL INK AMOUNT | COLORIMETRIC SPECTROSCOPY | ppm | (1200) | 90 | 150 | 300 |
| RESIDUAL METAL AMOUNT | GRAVIMETRIC METHOD | ppm | (200) | 0 | 0 | 100 |
| CLEANING SOLUTION / RESIN | WEIGHT RATIO | | | 32 | 10 | 32 |

FIG. 15

| TEST ITEMS | UNIT | $R_V$ | $S_2$ | $S_3$ |
|---|---|---|---|---|
| PAWL BREAKING STRENGTH (AVERAGE VALUE) | kg | 1.60 | 1.65 | 1.62 |
| STANDARD DEVIATION (n = 10) | kg | 0.06 | 0.08 | 0.07 |

FIG. 16

| TEST ITEMS | TEST CONDITIONS | UNIT | $R_4$ | $S_4$ | $C_{41}$ | $C_{42}$ |
|---|---|---|---|---|---|---|
| IZOD IMPACT STRENGTH | ASTM-D256 COMPLYING WITH | J/m | 157.8 | 145.0 | 121.5 | 117.7 |
| MFR | JIS-K7210 COMPLYING WITH | g/10min. | 40.7 | 42.0 | 45.0 | 52.0 |
| COLOR DIFFERENCE (ΔE) | JIS-Z8722 COMPLYING WITH | | REFERENCE | 0.35 | 1.03 | 1.16 |
| RESIDUAL MOISTURE CONTENT | GRAVIMETRIC METHOD | WT% | | 0.11 | 0.55 | |
| RESIDUAL INK AMOUNT | COLORIMETRIC SPECTROSCOPY | ppm | (700) | 10 | 340 | |
| RESIDUE SUCH AS METAL | VISUAL CHECK | | (NONE) | NONE | NONE | |
| CLEANING SOLUTION / RESIN | WEIGHT RATIO | | | 32 | 5 | 32 |

FIG. 17

| TEST ITEMS | TEST CONDITIONS | UNIT | R5 | S51 | S52 | S53 | S55 |
|---|---|---|---|---|---|---|---|
| IZOD IMPACT STRENGTH | ASTM-D256 COMPLYING WITH | J/m | 156.9 | 153.4 | 148.3 | 150.8 | 145.6 |
| ROCKWELL HARDNESS | ASTM-D785 COMPLYING WITH | — | 111 | 110 | 110 | 110 | 110 |
| MFR | JIS-K7210 COMPLYING WITH | g/10min. | 43 | 42 | 41 | 42 | 44 |
| COLOR DIFFERENCE (ΔEab*) | JIS-Z8722 COMPLYING WITH | — | STD | 0.22 | 0.38 | 0.48 | 0.51 | ial, and a method of reusing a plastic material.

RECYCLED PLASTIC MATERIAL, ELECTRONIC APPARATUS HAVING THE RECYCLED PLASTIC MATERIAL, METHOD OF MANUFACTURING PLASTIC PART, METHOD OF MANUFACTURING THE RECYCLED PLASTIC MATERIAL, AND METHOD OF REUSING PLASTIC MATERIAL

This is a divisional application of application Ser. No. 09/564,501, filed on May 4, 2000.

FIELD OF THE INVENTION

The present invention relates to a recycled plastic material made from a thermoplastic product, an electronic apparatus using this recycled plastic material a method of manufacturing a plastic part, a method of manufacturing the recycled plastic material, and a method of reusing a plastic material.

BACKGROUND OF THE INVENTION

Recently, with increasing consciousness of environmental protection, the movement of recycling and reusing petrochemicals, in addition to conventionally recycled metal materials, has become active. Only in Japan territory, "Waste Disposal Law" (Law No. 137, 1970), "Law for Promotion of Sorted Collection and Recycling of Containers and Packaging" (Law No. 112, 1995), and "Law for Recycling of Specific Household Appliances" (Law No. 97, 1998) have been enforced. As these laws and regulations have been enacted, recycling of thermoplastics of some large household appliances and automobiles has been accelerated.

Many of these recycling activities, however, are thermal recycling using thermoplastics as a heat source and recycling for cascade use in which a lowering of the physical properties of recycled thermoplastics is of little problem. Therefore, little care is taken of sorting of thermoplastics contained in electronic apparatuses, such as copying machines, facsimile machines, personal computers and their peripheral devices (printers, keyboards, and displays), and in expendables (e.g., toner cartridges and ink cartridges) of these electronic apparatuses. As a consequence, thermoplastics to be recycled contain various contaminants, so it is impossible to obtain thermoplastics which can be reused as the same products or parts.

Also, even when electronic apparatuses and their components (to be collectively referred to as electronic apparatuses hereinafter) are manufactured using recycled thermoplastics, these thermoplastics are in most cases used as packaging containers and packing materials. That is, recycled plastic materials are not used to manufacture the original electronic apparatuses. In particular, labels, seals, and decals (to be collectively referred to as labels hereinafter) on which explanation of operation of an electronic apparatus is printed are pasted on external parts of electronic apparatuses. The base material or adhesive of such a label pasted on an external part cannot be removed only by cleaning. At present, the adhesive sticking to the part must be cut away using a cutter or the like, and this increases the recycling cost.

Analogously, an electronic apparatus incorporating an ink holding member for holding ink, represented by an ink-jet apparatus for printing desired character information and image information (to be collectively referred to as image information hereinafter) by discharging ink droplets from discharge orifices onto an arbitrary printing medium, such as paper, cloth, plastic, or metal, or a cartridge containing ink, has a part to which ink and its components have stuck. When this part is directly recycled, the residual ink and its components deteriorate the physical properties and change the hue of the part. This makes recycling of such parts very difficult. Furthermore, these ink-jet apparatuses contain not only inks but also pollutants such as a lubricating agent (e.g., grease) for mechanical driving portions. Hence, these inkjet apparatuses require a more complicated process and a higher recycling cost than those of plastic material recycling that can be commonly thought of. For this reason, no recycling using components of ink-jet apparatuses as materials have been performed.

As methods of recycling in this field, some techniques have been disclosed in Japanese Patent Laid-Open Nos. 5-301222 and 7-323560 and U.S. Pat. No. 2,513,106. The technique disclosed in Japanese Patent Laid-Open No. 7-323560 has disclosed only a method of directly reusing parts to be recycled by cleaning.

The technique disclosed in Japanese Patent Laid-Open No. 5-301222 compensates for a lowering of the physical property values of recycled plastic materials by additives. The technique disclosed in U.S. Pat. No. 2,513,106 compensates for a lowering of the physical property values of recycled plastic materials by polymer selection.

On the other hand, a so-called laser engraving technique is known as a method of displaying desired image information by changing the color of the surface of a plastic part. This technique can print operation instructions of an apparatus directly on a part, so the cost and the number of steps necessary to remove a pasted label can be reduced. Details of this laser engraving technique are described in Japanese Patent Publication Nos. 61-11711 and 62-59663. However, these patent publications have disclosed only the basic techniques of laser engraving and do not exhibit any practical method pertaining to recycling of laser-engraved plastics.

When the physical properties of a material are taken into consideration, the range of use of a recycled material greatly widens if physical property values equivalent to those of its original virgin material are guaranteed. To guarantee physical property values, however, if the addition of additives or the selection of polymers is performed in the recycling process as in the aforementioned prior art, the cost of control of input amounts of additives or the cost of selection of polymers increases the total cost of recycling. This can postpone switching from virgin materials to recycled materials.

Also, as one characteristic of thermoplastics, linear patterns such as black streaks or silver streaks sometimes form on the surface of a molded product owing to the influence of heat applied during molding. These patterns are primarily caused by the molding conditions. However, if foreign matter is mixed in a material itself, a black dot often appears on the surface.

When laser engraving which discolors or carbonizes the surface of an object to be processed is performed, the engraved portion itself can become foreign matter if the object is thermoplastic. Not only in laser engraving but also during use, collection, and disassembly of products, rubbish, dust, and foreign matter adhere to the surfaces of parts to be recycled. If these parts are not sufficiently cleaned and foreign matter is not well removed, larger amounts of foreign matter than when virgin materials are used are produced when these parts are used as recycled materials. This can impair the product value of especially external parts of electronic apparatuses.

SUMMARY OF THE INVENTION

The present invention, therefore, has been made in consideration of the above situation, and has as its object to provide a high-quality recycled plastic material of thermoplastic whose physical property values lower little from those of a virgin material, without adding any step to commonly performed recycling steps of pulverizing, cleaning, removable of a cleaner, drying, and removal of metals and foreign matter and, more particularly, to provide a recycled plastic material made from thermoplastic used in an ink-jet apparatus including ink and ink components.

It is another object of the present invention to provide an electronic apparatus using the above recycled plastic material.

It is still another object of the present invention to provide a method of manufacturing a plastic part using the recycled plastic material.

It is still another object of the present invention to provide a method of manufacturing the recycled plastic material.

It is still another object of the present invention to provide a method of reusing a plastic material.

To solve the above problems and achieve the objects, the present invention is constituted as follows.

The first mode of the present invention is a recycled plastic material made from laser-engraved thermoplastic.

The second mode of the present invention is a recycled plastic material manufactured by pulverizing laser-engraved thermoplastic, cleaning the pulverized thermoplastic, removing a cleaning solution from the cleaned thermoplastic to dry the thermoplastic, and removing from the dried thermoplastic solid matter other than the thermoplastic.

In the first and second modes of the present invention, the recycling process of the recycled plastic material does not require any label peeling step. Also, since no paint such as used in silk screen printing sticks to the material, the recycling process can be simplified, and deterioration of the hue of the obtained recycled plastic material can be prevented.

The third mode of the present invention is a recycled plastic material made from thermoplastic containing a metal.

The fourth mode of the present invention is a recycled plastic material manufactured by pulverizing thermoplastic containing a metal, cleaning the pulverized thermoplastic, removing a cleaning solution from the cleaned thermoplastic to dry the thermoplastic, and removing from the dried thermoplastic solid matter other than the thermoplastic.

In the present invention, not only metals (including metal particles) contained in thermoplastic as a raw material but also most metal pieces which can be mixed when the raw material is pulverized during the recycling process can be easily removed. This enhances the effect of finally removing solid matter other than the thermoplastic. Therefore, contamination is very little, so recycled plastic having high external appearance quality can be obtained.

The fifth mode of the present invention is a recycled plastic material made from thermoplastic used in an ink-jet apparatus.

The sixth mode of the present invention is a recycled plastic material manufactured by pulverizing thermoplastic used in an inkjet apparatus, cleaning the pulverized thermoplastic, removing a cleaning solution from the cleaned thermoplastic to dry the thermoplastic, and removing from the dried thermoplastic solid matter other than the thermoplastic.

The seventh mode of the present invention is a recycled plastic material made from thermoplastic to which ink and components thereof are sticking.

The eighth mode of the present invention is a recycled plastic material manufactured by pulverizing thermoplastic to which ink and components thereof have stuck, cleaning the pulverized thermoplastic, removing a cleaning solution from the cleaned thermoplastic to dry the thermoplastic, and removing from the dried thermoplastic solid matter other than the thermoplastic.

When a product, such as an ink cartridge, which contains ink and an ink holding member impregnated with the ink is to be recycled, an external member of the product must be separated from the ink holding member. If this external member is cut by a cutter or the like, a portion of the ink holding member, such as foamed polyurethane, is often welded to the cut surface. This welded foamed polyurethane cannot be washed away by cleaning operation alone. Processes such as cleaning solution removal and drying allow easy separation of the foamed urethane from the external member. The state of adhesion of rubbish, dust, and foreign matter to the product to be recycled cannot be specified. Hence, by executing the processing following the aforementioned procedure, effective foreign matter removal is performed with a minimum necessary load.

The ninth mode of the present invention is an electronic apparatus comprising the recycled plastic material according to any one of the first to eighth modes described above.

When the recycled plastic material of the present invention is used in electronic apparatuses rapidly increasing in product shipment quantity recently, the use and spread of this recycled plastic material are promoted.

The 10th mode of the present invention is a method of manufacturing a plastic part, comprising the steps of disassembling an electronic apparatus having a laser-engraved thermoplastic part, separating the thermoplastic part from the disassembled electronic apparatus and pulverizing the thermoplastic part, cleaning the pulverized thermoplastic, removing a cleaning solution from the cleaned thermoplastic to dry the thermoplastic, removing from the dried thermoplastic solid matter other than the thermoplastic, and molding a thermoplastic part of the electronic apparatus by using the thermoplastic, from which the solid matter is removed, as a raw material.

The 11th mode of the present invention is a method of manufacturing a plastic part, comprising the steps of disassembling an ink container used in an inkjet apparatus, separating a thermoplastic part from the disassembled ink container and pulverizing the thermoplastic part, cleaning the pulverized thermoplastic, removing a cleaning solution from the cleaned thermoplastic to dry the thermoplastic, removing from the dried thermoplastic solid matter other than the thermoplastic, and molding a thermoplastic part of the inkjet apparatus by using the thermoplastic, from which the solid matter is removed, as a raw material.

The 12th mode of the present invention is a recycled plastic material manufactured by recycling a part molded from a thermoplastic material, characterized in that an impact strength of the recycled plastic material is 80% or more of a virgin plastic material, and a melt flow rate (MFR), indicating the flowability of a plastic material, of the recycled plastic material is 90 to 120% of the virgin plastic material.

The 13th mode of the present invention is a method of manufacturing a recycled plastic material, characterized in that in order to recycle a part molded from a thermoplastic material, plastic is repelletized through steps of pulverization, cleaning, drying, and foreign matter removal of the molded part, and an impact strength and a melt flow rate (MFR) of the plastic pellets are adjusted within the ranges of predetermined values.

The 14th mode of the present invention is a method of reusing a plastic material, characterized in that a part is molded from a plastic material, the molded part is used as a part after a laser engraving display is formed on the molded part, a recycled plastic material is formed through steps of pulverization, cleaning, drying, and foreign matter removal of the part, and an impact strength of the recycled plastic material falls within a predetermined range of an impact strength of a virgin plastic material.

The 15th mode of the present invention is a method of reusing a plastic material, characterized in that a plastic material is molded into an ink container and used as a part, a recycled plastic material is formed through steps of pulverization, cleaning, drying, and foreign matter removal of the part, and physical property values of the recycled plastic material fall within predetermined ranges of physical property values of a virgin plastic material.

The 16th mode of the present invention is a method of manufacturing a recycled plastic material, characterized in that a recycling raw material is obtained by successively performing, in the order named, the pulverizing step of pulverizing a part molded from a thermoplastic material by using a mesh screen of 4 to 10 mm, the cleaning step of cleaning a pulverized material obtained in the pulverizing step by using 10 parts by weight of water as a cleaning solution with respect to 1 part by weight of the pulverized material, the dehydrating step of dehydrating the pulverized material cleaned in the cleaning step by centrifugal dehydration to set a moisture content to not more than 0.30 wt %, the foamed body removing step of removing, by air classification, a foamed body having a bulk density difference of not less than 0.5 from the pulverized material dehydrated in the dehydrating step, the first metal removing step of removing a metal from the pulverized material by using a magnet having a residual magnetic flux density of not less than 1 tesla, and the second metal removing step of removing a metal by using a metal detecting/removing device, and recycled plastic pellets are obtained by successively performing, in the order named, the mixing step of sufficiently mixing the recycling raw material the recycling step of melting, kneading, and recycling the recycling raw material by an extruder, and the pelletizing step of pelletizing the material recycled in the recycling step.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 13 is a view showing the physical property values of plastic materials of the Example 1 and comparative examples;

FIG. 14 is a view showing Example 2 and its comparative examples, and the physical property values of plastic materials of Example 3;

FIG. 15 is a view showing the physical property values of plastic materials of the Examples 2 and 3;

FIG. 16 is a view showing the physical property values of plastic materials of the Example 4 and comparative examples; and FIG. 17 is a view showing the physical property values of plastic materials of the Example 5.

DETAILED DESCRIPTION OF THE PREFERRED EMBODIMENTS

Figure 1:
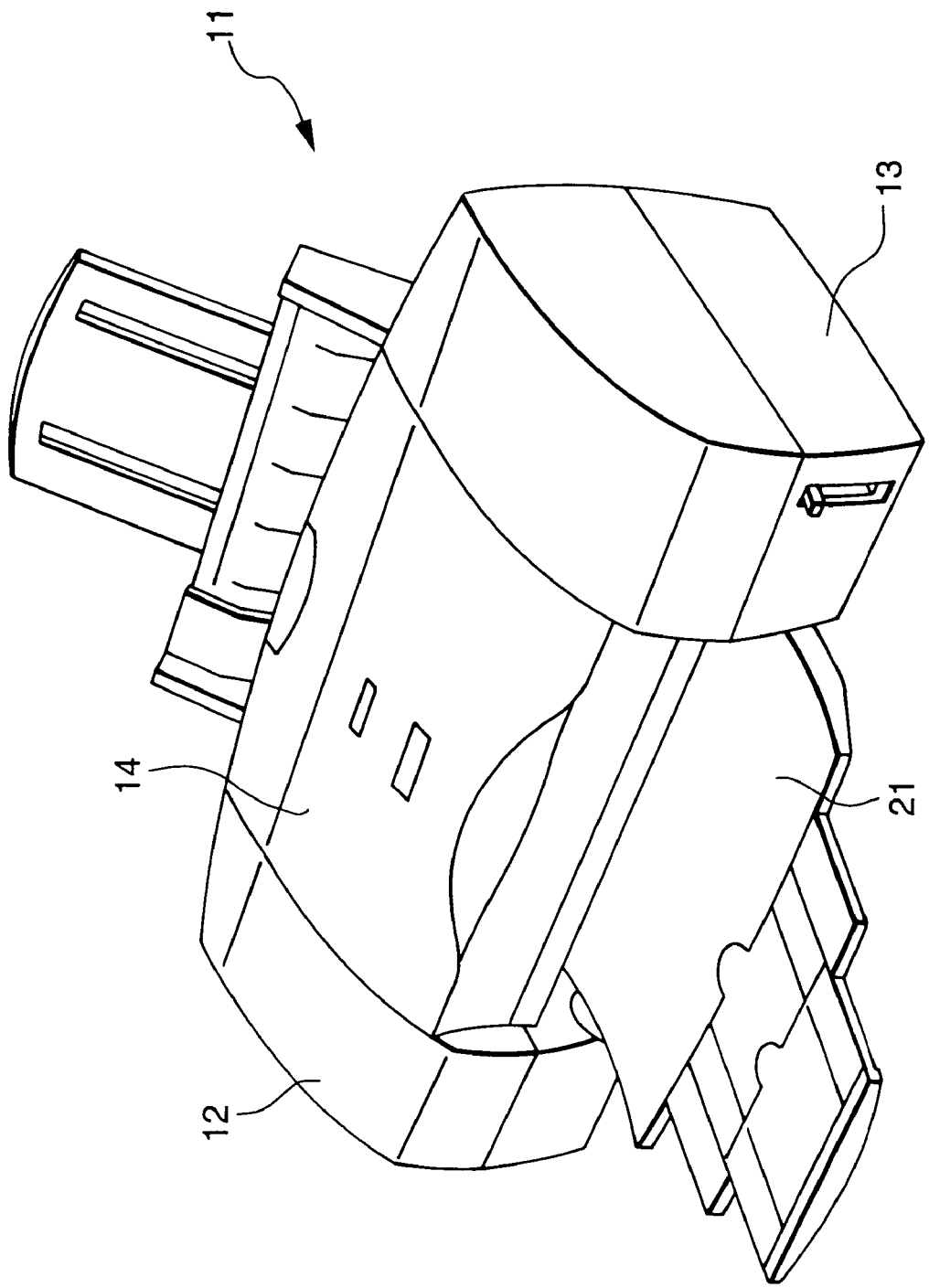
FIG. 1 is a perspective view showing the external appearance of an inkjet printer as an object of the present invention.

In the recycled plastic material according to the first or second mode of the present invention, it is preferable that the area of laser engraving be 2% or less of the surface area of a plastic part to be recycled, the width of one scanning line of laser engraving be 0.15 mm or less, or the depth of laser engraving be 0.05 mm or less.

This restricts the discolored matter and carbonization amount of thermoplastic by a laser and enhances the cleaning effect during recycling, thereby minimizing the production of foreign matter on the surface of a molded product. Also, since the amount of foreign matter is small, a lowering of the physical property values is suppressed, so the quality of the recycled plastic material can be held substantially the same as the virgin material.

In the recycled plastic material according to the fourth mode of the present invention, pulverized thermoplastic can also be separated from metals before being cleaned.

Also, the step of removing solid matter other than thermoplastic can have at least one of gravity separation which uses the true density difference between the thermoplastic and the foreign matter, magnetic separation which uses magnetic force, and metal separation which uses an eddy current. Metal separation using an eddy current is employed for metals, except for ferroelectric substances, which cannot be separated by magnetic force.

In the recycled plastic material according to the fourth, sixth, or eighth mode of the present invention, thermoplastic can be pulverized by a high-speed pulverizer by using a mesh screen within the range of 4 to 10 mm, and fine plastic particles of 2 mm or less, metal particles, and dust particles can be removed using a shaking screen.

If the mesh screen for pulverization is less than 4 mm, the amount of fine particles increases to increase losses during cleaning and drying steps, thereby decreasing the yield. In contrast, if the mesh screen is larger than 10 mm, the size of a pulverized product becomes too large. This readily causes clogging and the like in the subsequent processing and lowers the workability.

Consequently, most of metals which cannot be removed by selection before pulverization and metal pieces mixed during pulverization can be removed. This enhances the effect of removing final solid matter other than thermoplastic. So, recycled plastic having very little contamination and having excellent external appearance quality can be obtained.

In the recycled plastic material according to the sixth mode of the present invention, ink and its components, paper dust, and dust particles sticking to thermoplastic can be removed by cleaning this thermoplastic. Also, pulverized thermoplastic can be separated from foreign matter before being cleaned. Furthermore, a cleaning solution used in cleaning can be filtered through a filter having a mesh within the range of 25 to 200 μm to reuse the filtered cleaning solution.

Most preferably, a cleaning solution used in cleaning is directly reused. However, a cleaning solution used in cleaning is colored by coloring agents contained in ink, so it is basically difficult to directly reuse this cleaning solution owing to suspended fine particles and the problem of color. In particular, particulate contamination has adverse effect on the physical properties of a recycled plastic material and therefore must be removed. The smaller the mesh size (filtering accuracy) of the filter used, the more the physical properties of the recycled plastic material improve, but the more easily filter clogging takes place. The use of a filter having a mesh within the range of 25 to 200 μm can improve the physical properties of a recycled plastic material obtained and solve the problem of filter clogging at the same time.

A cleaning solution can contain at least one of an additive for adjusting the pH concentration and a surfactant.

The pH concentration of ink must be measured from the ink itself. For example, even if a dye contained in ink is acidic, the ink itself is alkaline in some cases.

For instance, when the ink is acidic, a cleaning solution dissolved in the ink also becomes acidic, and this cleaning solution becomes an environmental load because its acidic concentration rises during the process of reuse. Additionally, cleaning using only water is unsatisfactory depending on the type of ink, so a large amount of water must be used for long time periods in order to enhance the cleaning effect. By the addition of an additive for adjusting the pH concentration and a surfactant, these inconveniences are solved, and the cleaning process is completed within a short time.

Similarly, when the ink is alkaline, the alkali concentration of a cleaning solution rises during the process of reuse, and this cleaning solution becomes an environmental load.

When the ink is neutral, a cleaning solution is filtered to remove foreign matter, and the resultant cleaning solution is directly reused.

Tap water (pH≈7.6, weakly alkaline) can also be used as a cleaning solution. It is also effective to consider the pH concentration of this cleaning solution on the basis of tap water. In the recycled plastic material according to the seventh or eighth mode of the present invention, ink and its components can be an ink used in an inkjet apparatus.

In the recycled plastic material according to the eighth mode of the present invention, a cleaning solution can be water, and this water used in cleaning can be reused after being filtered. If this is the case, a filter for filtering the water preferably has a mesh within the range of 25 to 200 μm.

Since the cleaning solution is water, the economical efficiency and the safety of work improve compared to a case in which an aqueous cleaning containing an organic solvent, a surfactant, a builder, and the like is used. In addition, the load on the environment can be minimized by repetitively reusing the cleaning solution.

In the recycled plastic material according to the sixth or eighth mode of the present invention, the step of removing solid matter other than thermoplastic can include at least one of gravity separation using the true density difference between the thermoplastic and the solid matter, air classification using the bulk density difference between the thermoplastic and the solid matter, magnetic separation using magnetic force, and metal separation using an eddy current. In the air classification, the bulk density difference between the thermoplastic and the solid matter to be separated is preferably 0.5 or more.

The bulk density is the density of pores communicating with the outside air and internally confined pores in a polycrystalline substance, powdery layer, or molded product. The true density is the density of a solid itself, which does not include pores.

The air classification cannot achieve its effect before the cleaning step because a bulk density difference is not easily produced owing to the influence of residual ink, or before the drying step because a bulk density difference is similarly not easily produced. To readily produce a bulk density difference, the air classification step is performed after pulverization, cleaning, or drying. If the bulk density difference is less than 0.5, not only the accuracy of precision separation decreases, but also the yield of the recycling step lowers. Paper dust not completely removed in the cleaning step can be separated and removed by this air classification.

Furthermore, a cleaning solution used in cleaning can be reused by using a distillation apparatus.

To reuse a cleaning solution used in cleaning, not only removal of foreign matter by a filter but also adjustment of the pH concentration described above are combined into one system. This improves the cleanness of the cleaning solution when it is reused and reduce the environmental load.

The weight ratio of the cleaning solution to the pulverized thermoplastic can be 10 times or more.

If the supply ratio of the cleaning solution to the thermoplastic is less than the above value, the probability of the thermoplastic parts to be cleaned overlapping each other increases. This may lower the cleaning effect or make it impossible to reliably remove the cleaning solution in the subsequent step.

Inks for printing image information on printing media such as paper sheets have various compositions for, e.g., writing tools, stamps, recorders, and inkjet printing. Of these inks, inkjet printing ink will be explained as an example.

As representative ink, ink containing a plurality of dyes, glycerin, urea, IPA (isopropylalcohol), and pure water will be taken as an example.

All the dyes are water-soluble, and their balance is designed by taking account of the clearness upon printing, the concentration, and the water resistance.

Glycerin is a high-boiling solvent and has high surface tension. Hence, glycerin is used to prevent clogging of ink channels in an inkjet head, particularly clogging at discharge orifices. Urea is used to further enhance this clogging preventing effect and further increase the dye concentration of the ink. Clogging readily occurs especially when the amount of dyes in the ink increases, and urea has a function of preventing this clogging. IPA has a function of promoting ink penetration into a printing medium and moisture evaporation during fixing. This accomplishes both prevention of deterioration of a recorded image and promotion of fixation. These components are dissolved in pure water to prepare inkjet printing ink.

When ink having the above composition adheres to a plastic part, moisture evaporates with time, and some of the ink components such as dyes keep sticking to this plastic part. When the sticking amount of these ink components is limited to less than 300 ppm, no visual difference is found between the color of the recycled plastic material and that of the virgin material.

If the sticking amount of the ink or the ink components is large, the hue of the final form is influenced.

In the recycled plastic material according to the fourth or eighth mode of the present invention, gravity separation is preferably performed underwater, and the true density difference between thermoplastic to be separated and solid matter other than the thermoplastic is preferably 0.5 or more. Ceramics and metal oxides having larger true densities than that of thermoplastic are separated by settling in a cleaning solution such as water. If the true density difference is less than 0.5, the efficiency of separation of these substances lowers, and this degrades the yield of the recycling process.

Magnetic separation preferably uses a magnet having a residual magnetic flux density of 1 tesla or more. Thermoplastic and solid matter other than the thermoplastic are preferably brought into contact with the magnetic pole of this magnet.

Magnetic separation is suitable for ferromagnetic metals. The capture ratio of such ferromagnetic substances lowers if a magnet having a residual magnetic flux density of less than 1 tesla is used.

In the recycled plastic material according to the first to eighth mode of the present invention, letting $I_R$ and $M_R$ be the Izod impact value and the melt flow rate, respectively, of the recycled plastic material, and $I_V$ and $M_V$ be the Izod impact value and the melt flow rate, respectively, of the virgin material of thermoplastic before molding, $(I_R/I_V)>0.8$ and $(M_R/M_V)<1.2$ are preferably met.

Of the physical property values of thermoplastic, the Izod impact value indicates the impact strength of the material and is used to evaluate characteristics such as impact resistance, fragility, and toughness. When the material deteriorates and embrittles, the Izod impact value decreases. The melt flow rate (to be abbreviated as MFR hereinafter) is a measure indicating the flowability of thermoplastic in a molten state. The larger the value, the higher the flowability, and the smaller the molecular weight of the thermoplastic. When the material deteriorates, its molecular weight tends to decrease, so the MFR increases.

The individual physical property values have variations in virgin materials. Variations of the Izod impact value and the MFR are said to be about ±30%. This is a value at one grade of a certain material, and for the color of the material a plurality of colors are taken into consideration. A coloring agent used for coloration contains pigments, dyes, dispersants, and stabilizers. The grade and blending ratio of these components change from one color to another. Therefore, for a color of a certain specific hue, variations of the Izod impact value and the MFR are small; they can be thought of as about ±25%.

Also, the physical property values of a recycled plastic material are highly likely to vary from one lot to another, depending on the states of collected products as a raw material. Variations in one lot are expected to be slightly larger than those of a virgin material.

Accordingly, in order for a recycled plastic material to have performance equivalent to that of a virgin material, the physical property values must be more severely controlled; variations of the Izod impact value and the MFR are preferably decreased to ±20% or less. As described above, when a material deteriorates the Izod impact value decreases and the MFR increases. That is, the Izod impact value and the MFR of a recycled plastic material must be decreased to −20% or less and +20% or less, respectively.

When the Izod impact value and the MFR which significantly lower during the recycling process fall within the above ranges, the quality of the recycled plastic material is held substantially equal to that of the virgin material.

In addition to the recycled plastic material according to one of the first to eighth modes of the present invention, the virgin material of the thermoplastic before molding can also be used as a raw material.

Since the basic physical property values are kept in the range of variations of a virgin material, even when the amount of a recycled plastic material or the recovery amount of thermoplastic as a raw material varies, the recycled plastic material can be stably supplied by changing the mixing ratio.

In the recycled plastic material according to one of the first to eighth modes of the present invention, a thermoplastic material can be an ABS resin (Acrylonitrile Butadiene Styrene RESIN), a PS resin, or a PS-modified PPE resin (Polyphenylene ether RESIN modified by Polystyrene).

ABS and PS resins are so-called styrene-based polymers. An ABS resin is a copolymer of styrene ($CH_2$=$CHC_6H_5$), acrylonitrile ($CH_2$=$CHCN$), and butadiene ($CH_2$=$CH_2CH$=$CH_2$). A PS resin is a homopolymer of styrene ($CH_2$=$CHC_5H_6$). An AS resin as a copolymer of styrene and acrylonitrile is also a styrene-based resin.

A PS resin has relatively low mechanical strength and is particularly inferior in impact resistance. High-impact polystyrene (HIPS) is formed by blending an elastic substance such as butadiene rubber in order to improve this impact resistance. On the other hand, a PS resin has very high electrical insulating quality and also has good molding characteristics since it is superior in thermal stability and flowability in a molten state.

Acrylonitrile is added to an ABS resin to improve the chemical resistance and the heat resistance without losing the characteristics of a PS resin. Butadiene is added to an ABS resin to improve the impact resistance.

Since both PS and ABS resins are styrene-based polymers and they have similar polymer configurations, they are recycled by the same processing.

When the present invention is applied to a copolymer of a different material such as an alloy resin, the recycling conditions when a virgin alloy resin and a single recycled plastic material are mixed must be different from the recycling conditions when a virgin material of single plastic and a single recycled plastic material are copolymerized. Especially when a virgin alloy resin and a single recycled plastic material are mixed, a material far from the physical property values of the virgin alloy resin is sometimes formed. As an example, when a recycled plastic material of an ABS resin is mixed in virgin alloy resins of a PC and ABS, the physical property values depend upon the mixing ratio of this recycled plastic material of the ABS resin. More particularly, in mixing an ABS resin in the PC and ABS alloy resin in a stable polymer alloy state, an excessive amount of the ABS resin to be mixed indicates that incompatible matter with the PC and ABS alloy resin is mixed to influence the physical properties. When a recycled plastic material is used as a raw material for an alloy resin, an alloy resin must be prepared using a control value different from that for the virgin material.

An ABS virgin resin is used for the same ABS material. In this manner, the use of the same recycled plastic material obviates the need to control fine variations of the physical property values during polymerization and thereby simplifies the control of the physical property values of the recycled plastic material.

A cleaning solution is preferably removed from cleaned thermoplastic by the centrifugal removing method, and the moisture content of the final recycled plastic is preferably 0.30 wt % or less. If the moisture content is 0.30 wt % or more, the possibility of the flaky thermoplastic parts sticking to each other increases, and this produces adverse effect on thermoplastic which readily hydrolyzes. Also, the cleaning solution removal time is shortened compared to a filtering method using a filter, and this prevents deterioration of the color of the final recycled plastic material.

In the electronic apparatus according to the ninth mode of the present invention, a recycled plastic material can also include external parts of the electronic apparatus.

Since the present invention is applicable to external parts whose workmanship is severely evaluated, the physical property values of the materials can be maintained. In addition, the product value of the external appearance does not degrade even when the recycled plastic material is used. This greatly widens the range of applications of the recycled material. Also, the basis of material recycling is ideally recycling to a product or apart as a raw material. Therefore, recycling to an inkjet apparatus (including its parts) is desirable in this respect.

In the method of manufacturing a plastic part according to the 10th mode of the present invention, an electronic apparatus can be an inkjet apparatus, and thermoplastic parts can be external members of this inkjet apparatus.

In the method of manufacturing a plastic part according to the 11th mode of the present invention, a molded thermoplastic part can be a cover plate of an ink container.

EMBODIMENTS

Embodiments in which a recycled plastic material and an electronic apparatus according to the present invention are applied to an inkjet printer will be described in detail below with reference to FIGS. 1 to 17. However, the present invention is not limited to these embodiments and is similarly applicable to other techniques to be included in the concept of the present invention described in the scope of claims of this specification.

An inkjet printer as an object of the present invention prints by discharging ink from a printing head onto a printing medium. This inkjet printer has the advantages that the printing means can be made compact, high-definition images can be printed at high speed, images can be printed on plain paper sheets without any specific processing, the running cost is low, noise is little because the printer is of non-impact type, and color images can be readily printed by using inks of multiple colors.

Figure 2:
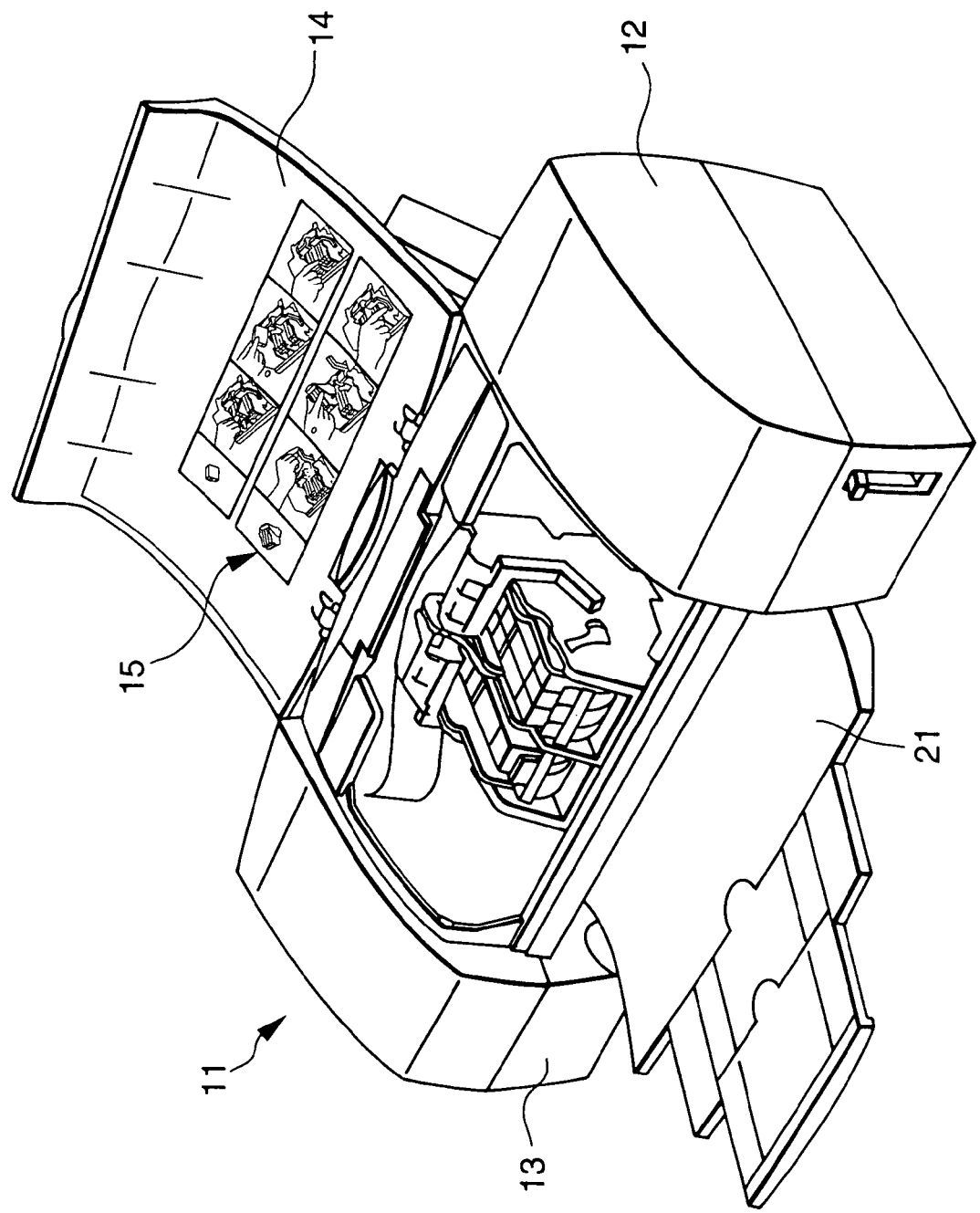
FIG. 2 is a perspective view showing the state in which an operation cover of the inkjet printer shown in FIG. 1 is opened.
Figure 3:
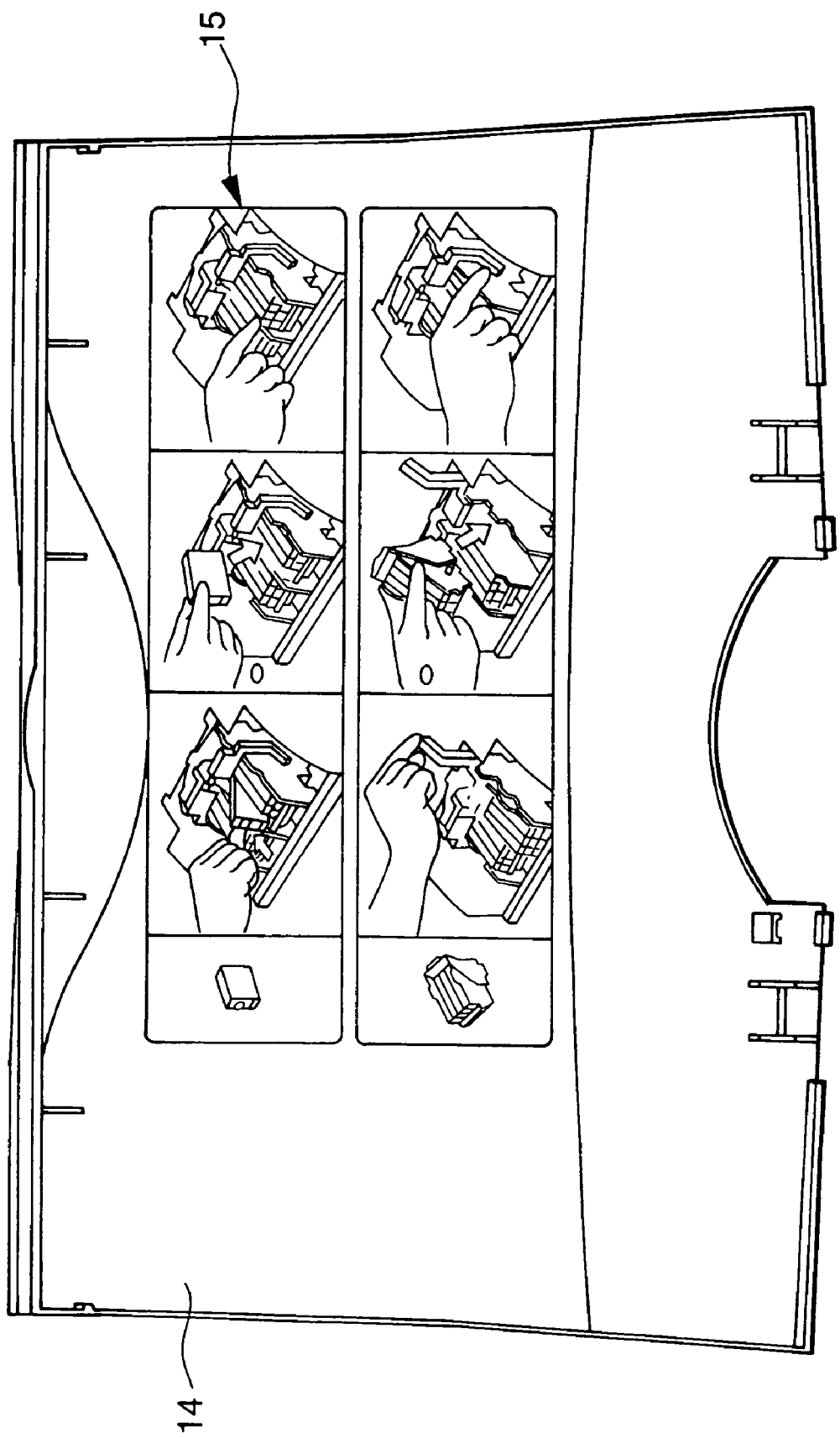
FIG. 3 is an enlarged front view of the operation cover shown in FIG. 2.

The external appearance of this inkjet printer is shown in FIG. 1. That is, an inkjet printer 11 of this embodiment includes an openable operation cover 14 between an upper case 12 and a lower case 13. As shown in FIG. 2, the operation cover 14 can be held open. On the inner surface of this operation cover 14, as shown in FIG. 3 which is an enlarged view of this portion, an illustration 15 depicting operation instructions of this inkjet printer 11 is laser-engraved. The operation cover 14 including this laser-engraved portion is used as the raw material of a recycled plastic material of this embodiment.

Figure 4:
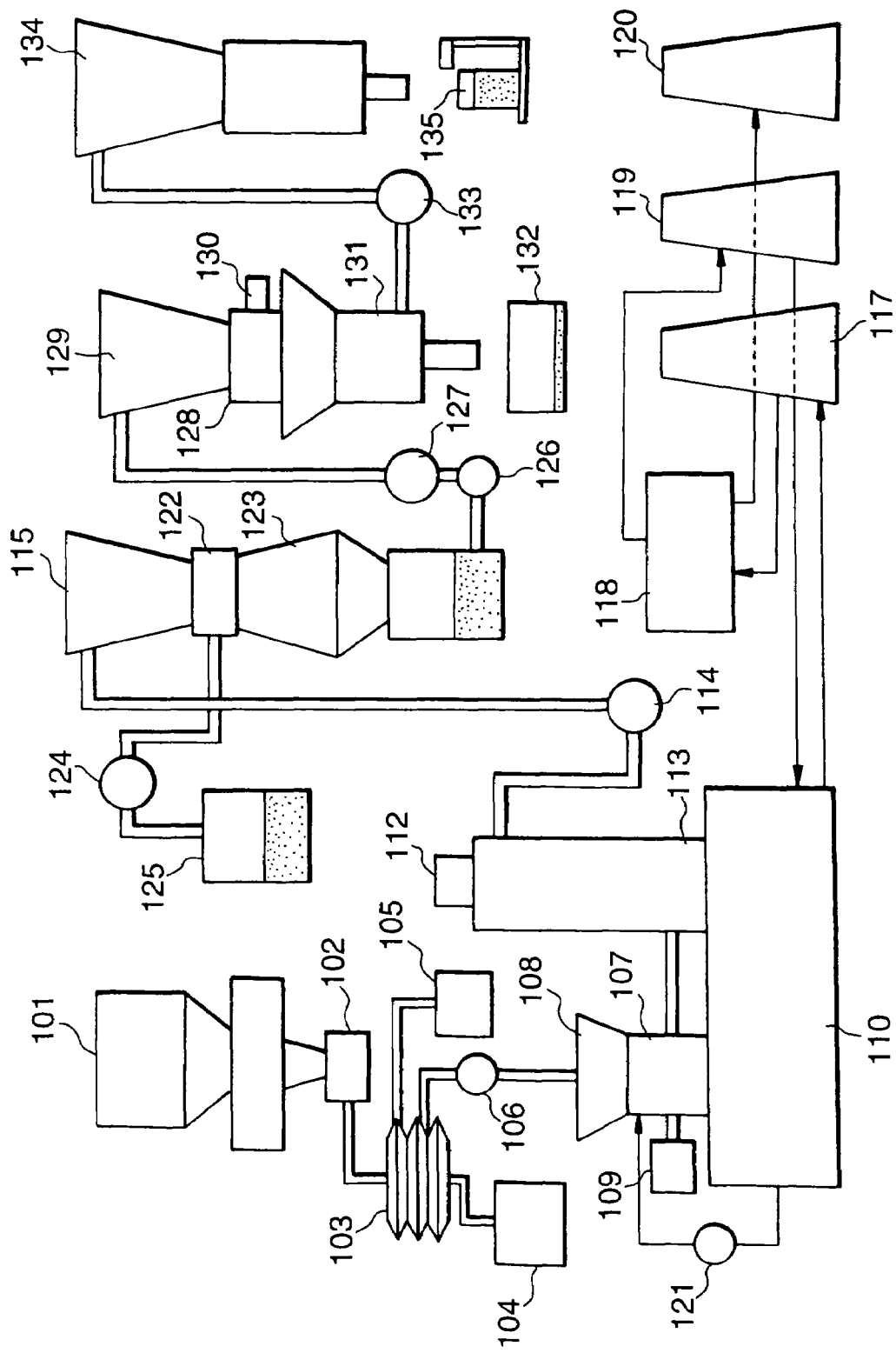
FIG. 4 is a view showing the concept of an example of a recycled plastic material manufacturing system according to the present invention.

FIG. 4 shows an outline of the configuration of a recycling system of this embodiment. That is, a pulverizer 101 pulverizes the raw material of a recycled plastic material into a predetermined size. A conveyor apparatus 102 conveys the pulverized raw material in units of predetermined amounts to a shaking screen 103. Fine particles which cause clogging or the like in the later work are discharged to a waste tank 104. The raw material which is not sufficiently pulverized is collected in a collecting tank 105 and returned to the pulverizer 101. The raw material which is pulverized into the predetermined size is passed through a magnetic separator 106 to capture ferromagnetic metals contained in the raw material. The resultant raw material is supplied to a hopper 108 of a screw feeder 107. This screw feeder 107 is driven by a motor 109 to supply the raw material in units of predetermined amounts into a cleaning solution tank 110.

Figure 5:
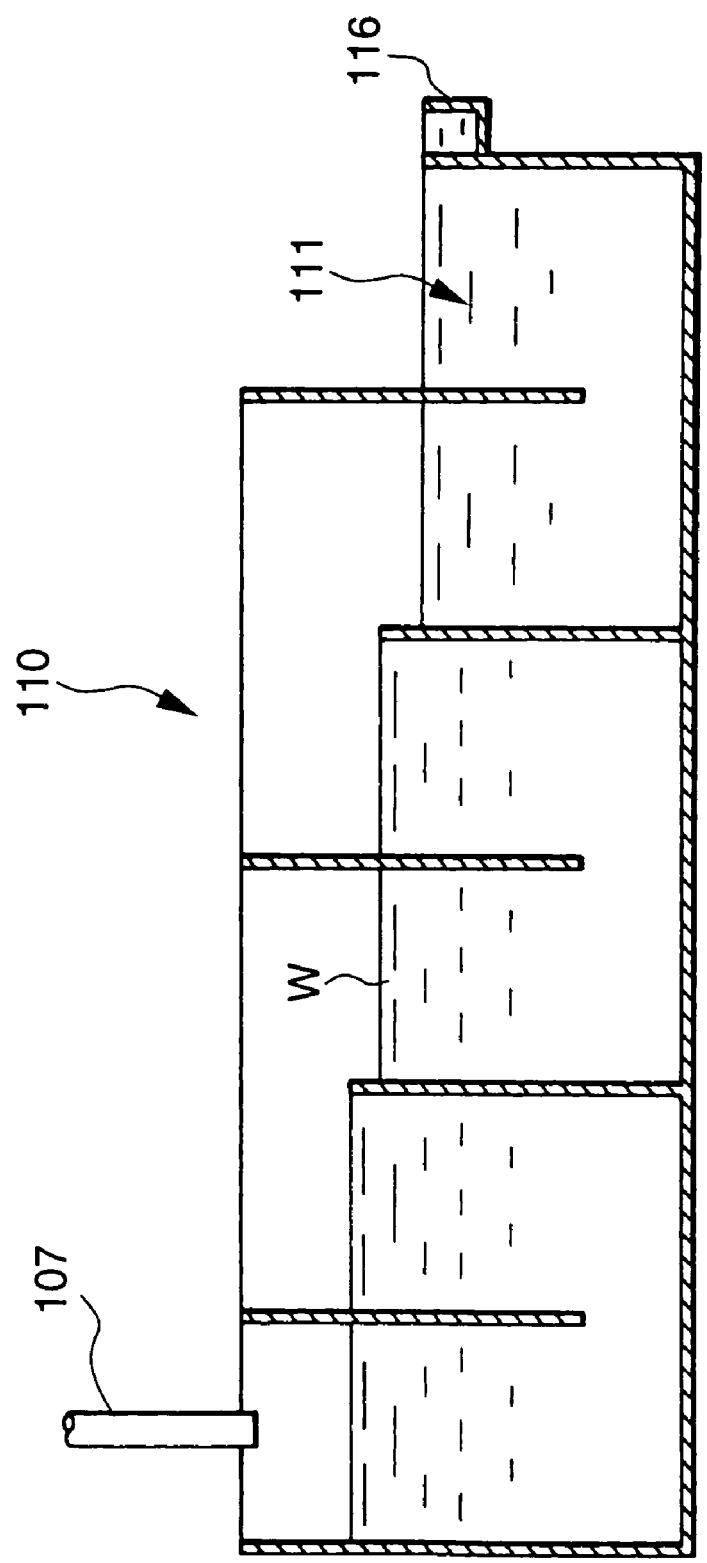
FIG. 5 is a sectional view showing the structure of a cleaning tank incorporated into the manufacturing system shown in FIG. 4.

FIG. 5 shows an outline of the structure of the cleaning solution tank 110 of this embodiment. That is, the cleaning solution tank 110 of this embodiment is partitioned into a plurality of baths to separate plastic as a recycling raw material by using the specific gravity difference between this plastic and foreign matter such as metals. The raw material flowing into the final bath is dehydrated by a cleaning/dehydrating apparatus 113, which is driven by a motor 112, and supplied to a cyclone 115 by an air blower 114.

A cleaning solution W overflowing from an overflow weir 116 of the cleaning solution tank 110 is supplied from a buffer tank 117 to a distillation concentrator 118. This distillation concentrator 118 supplies a purified cleaning solution to a condensate tank 119, and the cleaning solution is returned to the cleaning solution tank 110. The distillation concentrator 118 also discharges the residual solution colored by concentrated ink or the like to a concentrated solution tank 120.

A portion of the cleaning solution W overflowing from the overflow weir 116 is supplied little by little into the screw feeder 107 through a filter 121. The supplied cleaning solution is used as a lubricating agent to move the raw material in this screw feeder 107.

The raw material supplied to the cyclone 115 described above is air-classified in this cyclone 115 and dropped in units of predetermined amounts into an aspirator 123 by a rotary valve 122. A foamed polyurethane resin (which is contained in a cartridge to be described later and functions as an ink holding member) having a smaller bulk specific gravity than that of the raw material of a recycled plastic material is discharged to a collecting tank 125 by a blower 124.

The raw material flowing down from the aspirator 123 with metal particles and the like sticking to it is again passed through a magnetic separator 126 to capture and separate ferromagnetic metal particles sticking to its surface. The resultant raw material is supplied to a stock tank 129 of a screw feeder 128 by an air blower 127. The screw feeder 128 supplies this raw material in units of predetermined amounts to a metal separator 131 for separating metals from the raw material by using an eddy current or the like. This metal separator 131 separates metal particles contained in the raw material and discharges the metal particles to a collecting tank 132.

The raw material separated by the metal separator 131 is supplied into a hopper 134 by a blower 133 and collected as a final recycled plastic material by a collecting vessel 135.

EXAMPLE 1

Figure 6:
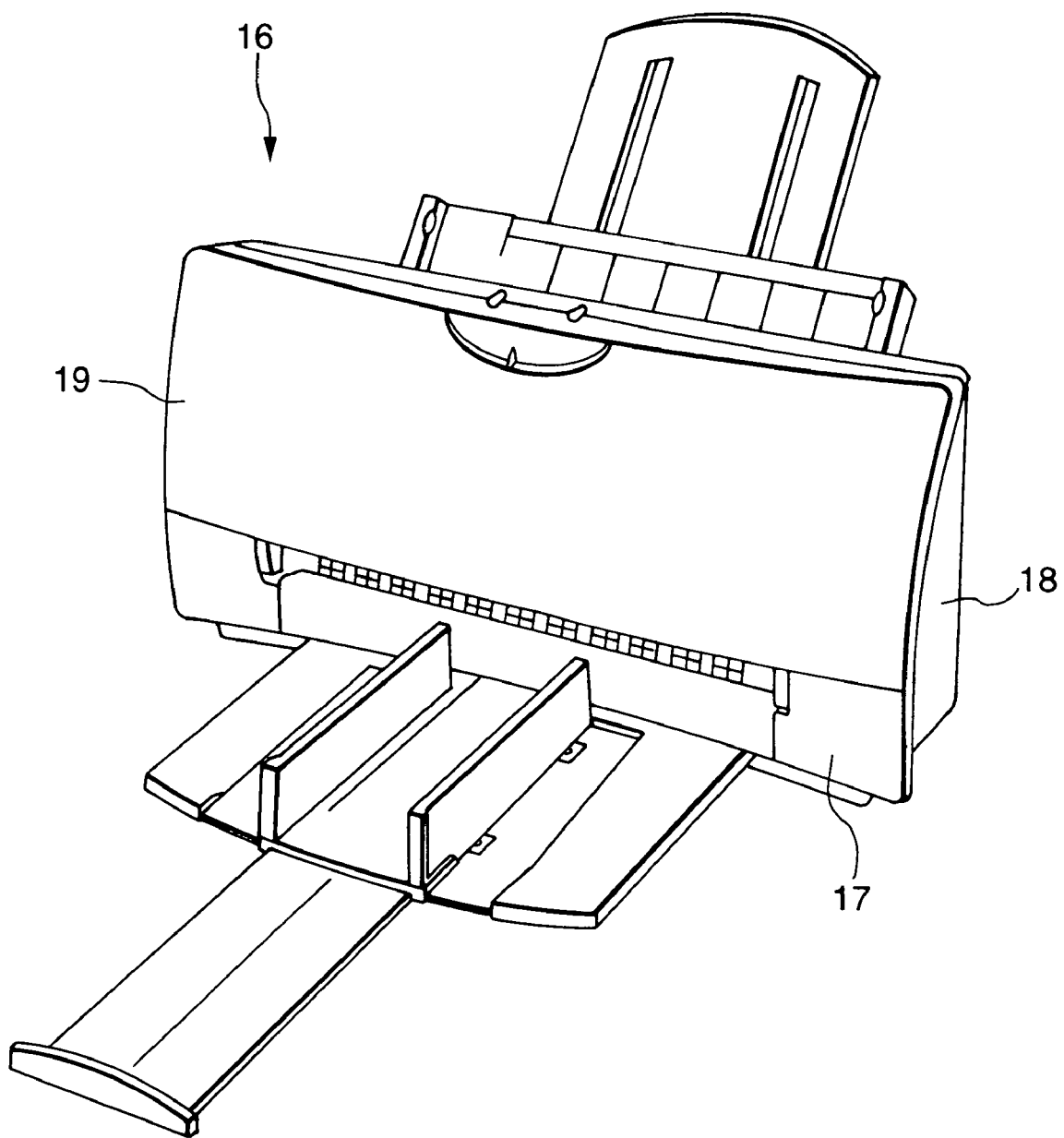
FIG. 6 is a perspective view showing the external appearance of another inkjet printer as an object of the present invention.
Figure 7:
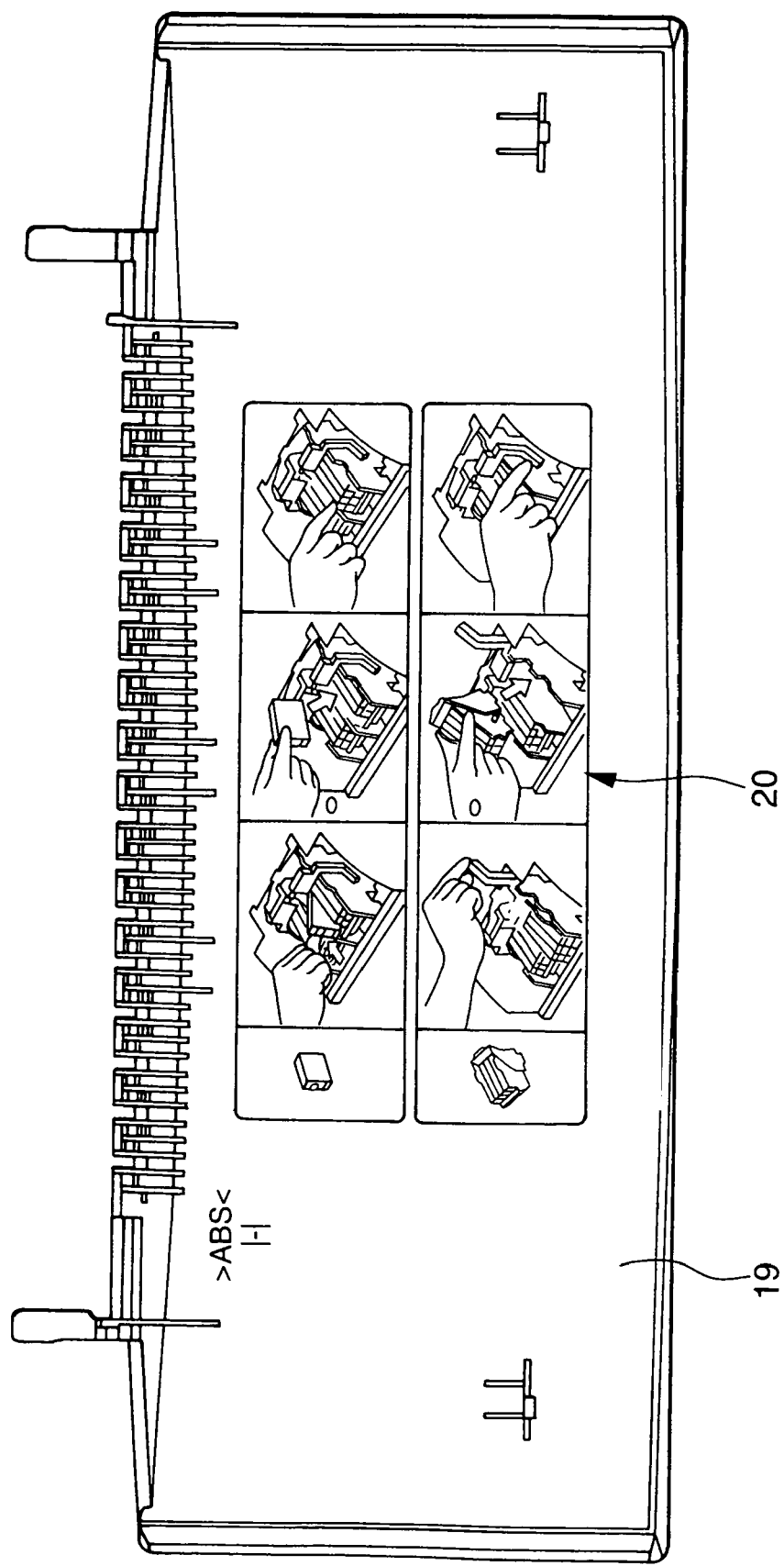
FIG. 7 is an enlarged front view of an operation cover of the inkjet printer shown in FIG. 6.

About 40 kg of a raw material were manufactured by laser-engraving an illustration 20 of operation instructions as shown in FIG. 7 on an operation cover 19 (material: ABS resin, average thickness 2.5 mm, true density 1.05) of an inkjet printer (BJC-430J: manufactured by CANNON INC.) as shown in FIG. 6. This ABS resin does not contain any filler or reinforcer for imparting characteristics such as strength, slidability, and flame retardancy. A different material such as a nameplate is not adhered to the ABS resin, either.

A laser engraving machine used in this embodiment is SMU65DT10DK (manufactured by BAASEL LASER-TECH, Germany). It has a Nd:YAG laser as a laser source, a wavelength of 1.064 µm, an output of 65 W, a turntable diameter of 1, 000 mm, and a lens focal length of 254 mm. This laser engraving machine also includes two engraving heads whose maximum engraving region diameter is 230 mm. It also includes an exhaust pump with filter in order to remove fume generated during laser engraving.

The nozzle of this exhaust pump is set as close as possible to the laser irradiation position so that the generated fume does not again adhere to the engraved surface of the operation cover 19 to degrade the quality of the engraved portion.

The line width of one scanning of a laser is an element determined from visibility. For example, the line width need only be 0.3 mm when characters laser-engraved on a white plastic material are to be viewed from a position 30 cm away. However, when the engraving contents such as operation instructions of particularly an electronic apparatus contain the illustration 20 as shown in FIG. 7, if an image portion in which repetitive scanning lines are densely formed and a character portion are engraved under the same conditions, the image portion is deeply engraved. Additionally, the protuberance of the resin around the engraved portion increases in size to break the contour. This consequently lowers the visibility. Accordingly, it is necessary to keep the balance of molten portions by engraving a plurality of times at the same depth while gradually shifting the position.

If the line width is large, the energy of laser increases the amount of discolored matter or carbide which can be foreign matter with respect to a recycled plastic material. Therefore, a system based on the balance between the amount of discolored matter or carbide and the visibility must be considered.

On the other hand, the deeper the engraved portion, the higher the contrast between this engraved portion and the surface, so the visibility improves. However, during recycling a deeper engraved portion is more difficult to clean. This increases the possibility of foreign matter remaining. To sufficiently supply a cleaning solution to an engraved portion, the section of a scanning line is preferably set to be semicircular. That is, the ratio of the engraving depth to the line width is preferably held ½ or less.

In many laser engraving machines, the scanning rate of an engraving head is variable. The line width and depth of engraving can be adjusted to optimum values by the energy amount of laser and the scanning rate of the engraving head. Consequently, the visibility of engraving of an image portion and that of a character portion can be held equivalent to each other.

The scanning rate depends upon the energy amount of a laser engraving machine used. However, the present inventors examined by taking the above elements into consideration and have found that to ensure visibility and prevent the production of discolored matter or carbide, it is preferable to set the line width and depth of one scanning of laser to 0.2 mm or less and 0.1 mm or less, respectively.

Compatibility with a different material is evaluated as follows. For example, a certain substance B is mixed at a weight ratio of C % in a substance A as a reference to measure physical property values. If the physical property values are equivalent to those of the substance A, the substance B is evaluated to have compatibility with the substance A. In the evaluation of compatibility label placed on the market, C=1% is generally used.

Since engraving by a laser is superficial, the weight ratio described above must be replaced with the surface area ratio by taking account of the thickness of a material to be engraved.

Of thermoplastics, those said to be suited to recycling do not contain any reinforcers or fillers. In the case of an ABS resin, PS resin, and PS-modified PPE resin, the thickness of a product is preferably 3.0 mm or less, except for special molding such as gas-assisted molding, when the transfer properties from a metal mold during injection molding are taken into consideration. Also, when the load resistance (strength) as a product of an electric/electronic apparatus is taken into account, the thickness must be approximately 2.0 mm or more if there is no reinforcement by other members.

Accordingly, the area of laser engraving is preferably t % or less of the surface area in accordance with a thickness t mm of a plastic part to be engraved, and is preferably 3.0% or less in electric/electronic apparatuses.

Alternatively, the line width of one scanning of laser engraving is set to 0.2 mm or less, or the depth of laser engraving is set to 0.1 mm or less. This is desirable to use this plastic part as a recycled plastic material.

When the thickness of product, the energy amount of laser, the visibility including a protuberance around the engraved portion, and the productivity (the tact time required for laser engraving, i.e., the irradiation time) are taken into consideration, laser engraving is optimally done if the laser engraving area is 3% or less of the surface area, the line width of one scanning is 0.15 mm or less, and the engraving depth is 0.05 mm or less.

In this embodiment, the thickness on the irradiated surface of one line engraved by the emitted laser was 0.12 mm, the depth from the irradiated surface was 0.05 mm, and the engraved area was about 920 mm. The surface area of the operation cover 19 described above was 686 cm, and the area ratio occupied by the laser engraved portion was 1.34%. The protuberance of a carbide formed by heat of the laser was not included in the measurements of the thickness and depth of the line.

To further improve the visibility of the engraved portion, processing data used in the laser engraving of this embodiment is obtained by partially changing a printing plate commonly used for an operation cover. For example, in a portion where two lines overlap, one line is cut to keep the balance of a portion melted by a laser uniform as a whole.

This operation cover was pulverized by attaching a 6-mm mesh screen to the pulverizer 101 (JC-10: manufactured by Morita Seiki K.K.) shown in FIG. 4.

The pulverized product was cleaned and the cleaning solution was removed by using a cleaning•cleaning solution removing apparatus (HIGHCHIP CLEANER CFP-500: manufactured by Toyo Seiki K.K., corresponding to 110 and 113 in FIG. 4). The plastic charge rate was 2.5 kg/min., and the flow rate of the cleaning solution W (tap water) was 80 liters/min. This cleaning solution W was received by the cleaning solution tank 110 having a capacity of 2,000 liters as shown in FIG. 5. To circulate and reuse the cleaning solution W by using a pump (not shown), the cleaning solution W was filtered by a filter housing (EBF112S6M: manufactured by Loffler K.K.) containing a nylon monofilament (R100NMO12M bug filter: manufactured by Loffler K.K., filtering accuracy 100 µm) The cleaned pulverized product from which the cleaning solution was removed was supplied to an air-classification aspirator system (KF-12: manufactured by Horai K.K., corresponding to 123 in FIG. 4) by the air blower 114 (DF-5: manufactured by Horai K.K.) and classified into low-bulk-density foreign matter and the other pulverized product.

The pulverized product passed through the air-classification aspirator system was dropped onto the magnetic separator 126 (MAGIC CATCH: manufactured by JMI K.K., residual magnetic flux density 1.3 tesla) to separate ferromagnetic components.

Subsequently, the pulverized product was conveyed to the stock tank 129 by the air blower 127 (DF-1: manufactured by Horai K.K.) This pulverized product was conveyed at a ratio of about 3 kg/min. from the stock tank 129 to an eddy current type metal detecting/removing apparatus (MDS-30A: manufactured by Sensor Technology K.K., corresponding to 131 in FIG. 4), thereby removing metal components. The finally obtained cleaned pulverized material weighed 38 kg.

The amount of moisture sticking to the obtained cleaned pulverized material was measured by the gravimetric method and found to be 0.11 wt %. Also, residual metal components were visually zero.

This cleaned pulverized material was pelletized. The obtained pellets were used to form five sample pieces (based on ASTM-D256: with ¼-inch notch) for Izod impact testing, and the Izod impact strength was measured.

The pelletization process was performed by attaching a 60-mesh filter to an extruder (DMG-40: manufactured by Nippon Purakon) and melting, kneading, and extruding the material at a cylinder temperature of 210° C. Izod impact testing sample pieces were formed using the pelletized pulverized material described above by setting an ASTM testing sample piece family mold in an injection molding machine (IS-80G: manufactured by Toshiba Machine Co., Ltd.) and injection-molding the material at a cylinder temperature of 200° C.

Color difference measurement (based on JIS-Z8722 condition D) was performed using Izod impact testing sample pieces formed from virgin pellets as a color difference standard with respect to the above sample pieces. Analogously, the MFR (based on JIS-K7210: 220° C., load 98.07N) was measured five times. The results are indicated by $S_1$ in FIG. 13.

A color difference $\Delta Eab^*$ in FIG. 13 is calculated as per JIS-K7105 by:

$$\Delta Eab^* = \sqrt{(\Delta L^*) + (\Delta a^*) + (\Delta b^*)}$$

The MFR (Melt Flow Rate) described above was measured in accordance with JIS-K7210B. This method measures the extrusion rate when molten thermoplastic is extruded at a prescribed temperature and pressure through a die (a metal block with a shaping mouthpiece) having a prescribed length and diameter. The method B is an automatic time measurement method applied to a material whose MFR is 0.50 to 300 g per 10 min.

A Techno Seven Full-Automatic Melt Indexer (#270) was used as the testing apparatus. The die (extruding portion) had a length of 8.0173±0.025 mm and an inside diameter of 2.092±0.002 mm.

This testing apparatus was filled with 7 g of a sample (resin) dried at 80° C. for 2 hr at a time. After being preheated at 220° C. for 6 min., the sample was extruded at the same testing temperature of 220% and a testing load of 98.07N (10 kgf). A time t (sec.) during which the piston moved 25.0 mm (L) was measured, and the MFR was calculated by:

$$MFR\,(220, 98.07, B) = 42.6 \times L \times \rho / t$$
$$= 42.6 \times 25.0 \times 0.953 / t$$

Note that a melt density $\rho$ of the resin at the testing temperature was 0.953 g/cm³.

Before the above recycling process was carried out, the physical property values in virgin pellet state of the material used were measured. The results are indicated by $R_V$ in FIG. 13. Also, to confirm changes in the physical property values due to injection molding, the above recycling process was performed using a comparative sample formed without laser-engraving the operation cover 19. The results are indicated by $R_1$ in FIG. 13.

As shown in FIG. 13, the Izod impact value and the MFR reduced 6.3% and 2.9%, respectively, from $R_V$ to $R_1$. From $R_V$ to $S_1$, the Izod impact value reduced 12.5% (6.7% with respect to $R_1$), whereas the MFR increased 0.6% (3.6% with respect to $R_1$). To give a recycled plastic material a performance equivalent to that of a virgin material, the Izod impact strength $R_V$ must be 0.8 times or less, and the MFR must be less than 1.2 times. From this viewpoint, the change rates of the physical property values described above well satisfy the characteristics of a recycled plastic material.

The color difference was evaluated by taking account of color difference variations in the virgin pellet state. In the case of an ABS resin, variations of color having influence on particularly $\Delta b$ are large, so complement is possible in the same process as a virgin material if $\Delta b^* \leq 1.0$. Therefore, since $\Delta Eab^* = 0.88$ is mostly composed of $\Delta b^* = 0.79$, the recycled plastic material can be used in the same manner as the virgin material.

The residual moisture was also 0.11 wt %, indicating that adverse effect on plastic caused by hydrolytic properties could be prevented.

The inkjet printer 11 (BJF-600: available from CANNON INC.) shown in FIGS. 1 to 3 is currently produced and sold by forming all of its plastic parts by using virgin materials. This inkjet printer 11 was manufactured using the cleaned pulverized material obtained through the above recycling process. More specifically, the cleaned pulverized material was applied to an upper case 12 (average thickness 2 mm, weight 389 g), a lower case 13 (average thickness 2 mm, weight 545 g), and an operation cover 14 (average thickness 2.3 mm, weight 159 g). FIG. 3 shows the state in which the illustration 15 for explaining operation was laser-engraved on the operation cover 14.

No difference was visually found between the external appearance and color (hue, saturation, and lightness) of each of these three parts and a corresponding part manufactured using the virgin material.

The external surface area of BJF-600 including this operation cover 14 is 4,920 cm², and the surface area of the laser-engraved portion is 920 mm². The ratio of the area of the laser-engraved portion to the external surface area is 0.187%. Compared to the aforementioned experiment, the area ratio of the laser-engraved portion reduces from 1.34% to 0.187%. In addition, a tray 21 for holding printed sheets is also formed using the same plastic material. Also, the operation cover 14 alone need not be recycled in a separate step in the recycling process. It is unlikely to recycle only the operation cover 14 in consideration of the number of steps.

Accordingly, the physical property values of the recycled plastic material manufactured using the external parts 12 to 14 of this inkjet printer 11 are expected to be closer to those of the virgin material than the physical property values obtained in the recycling process described above.

COMPARATIVE EXAMPLE OF EXAMPLE 1

Thermoplastic was recycled following the same procedures as in the Example 1 except that the contents of laser engraving were printed on a PS resin label (thickness 150 μm) and this label was pasted on the operation cover 19. The area of the pasted label was 186.2 cm$^2$, and its weight ratio to the operation cover 19 was about 3%.

The physical property values of this cleaned pulverized material, measured under the same conditions as virgin pellets, were that the Izod impact value was 97.1 J/m, the MFR was 53.7 g/10 min., and the color difference ΔE was 1.03. The measured physical property values are indicated by C in FIG. 13.

As shown in FIG. 13, from $R_V$ to $C_1$, the Izod impact value decreased 38.1%, and the MFR increased 10.0%. As described above, to obtain the performance equivalent to the virgin material, it is necessary to make the Izod impact strength 0.8 times or less and the MFR less than 1.2 times. Therefore, the recycled plastic material obtained from the operation cover 19 on which the PS resin label having the illustration formed by printing, instead of laser engraving, was pasted did not satisfy the required characteristics. Also, the color difference was larger than 1.0, indicating inferior quality to that of the virgin material.

In the above Example, external members of an ink-jet printer are used to form a recycled plastic material. A modification in which the present invention is applied to a cartridge of the aforementioned inkjet printer will be described below.

Figure 8:
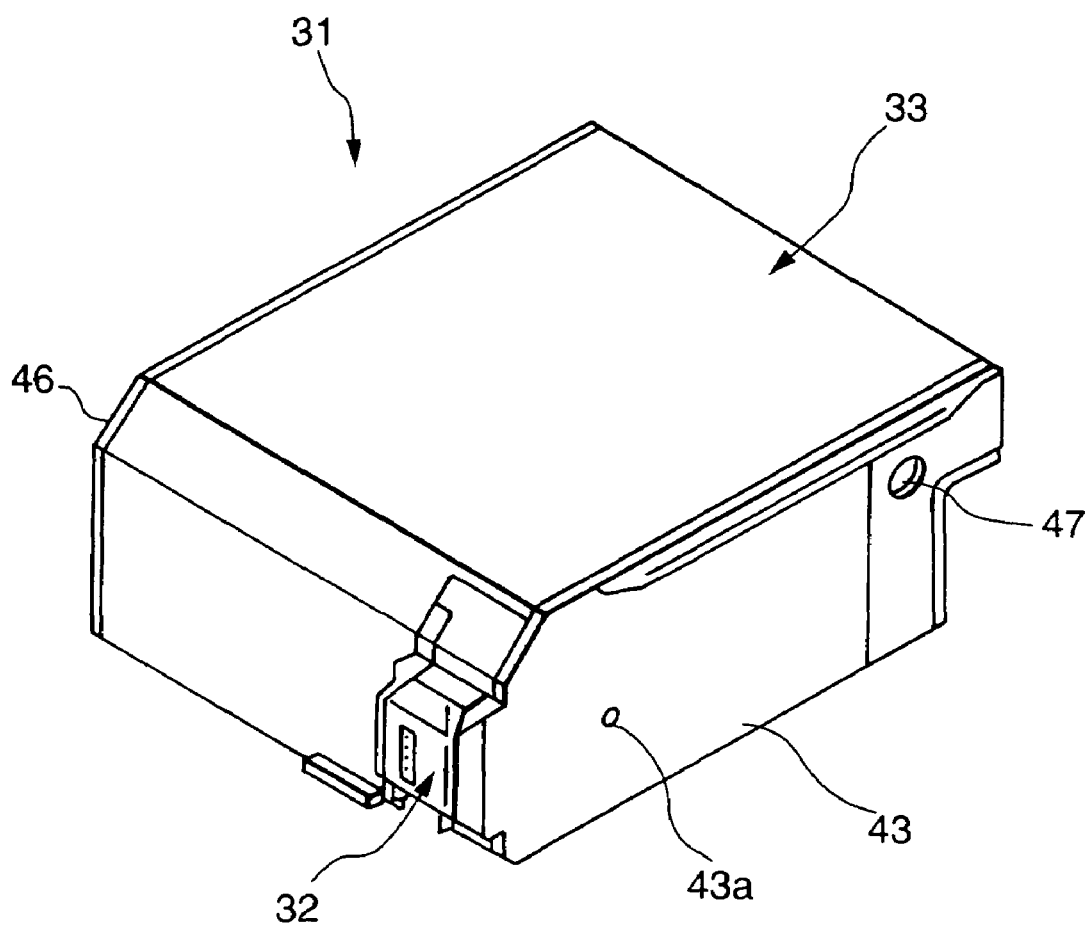
FIG. 8 is a perspective view showing the external appearance of an example of a cartridge used in the ink-jet printer.
Figure 9:
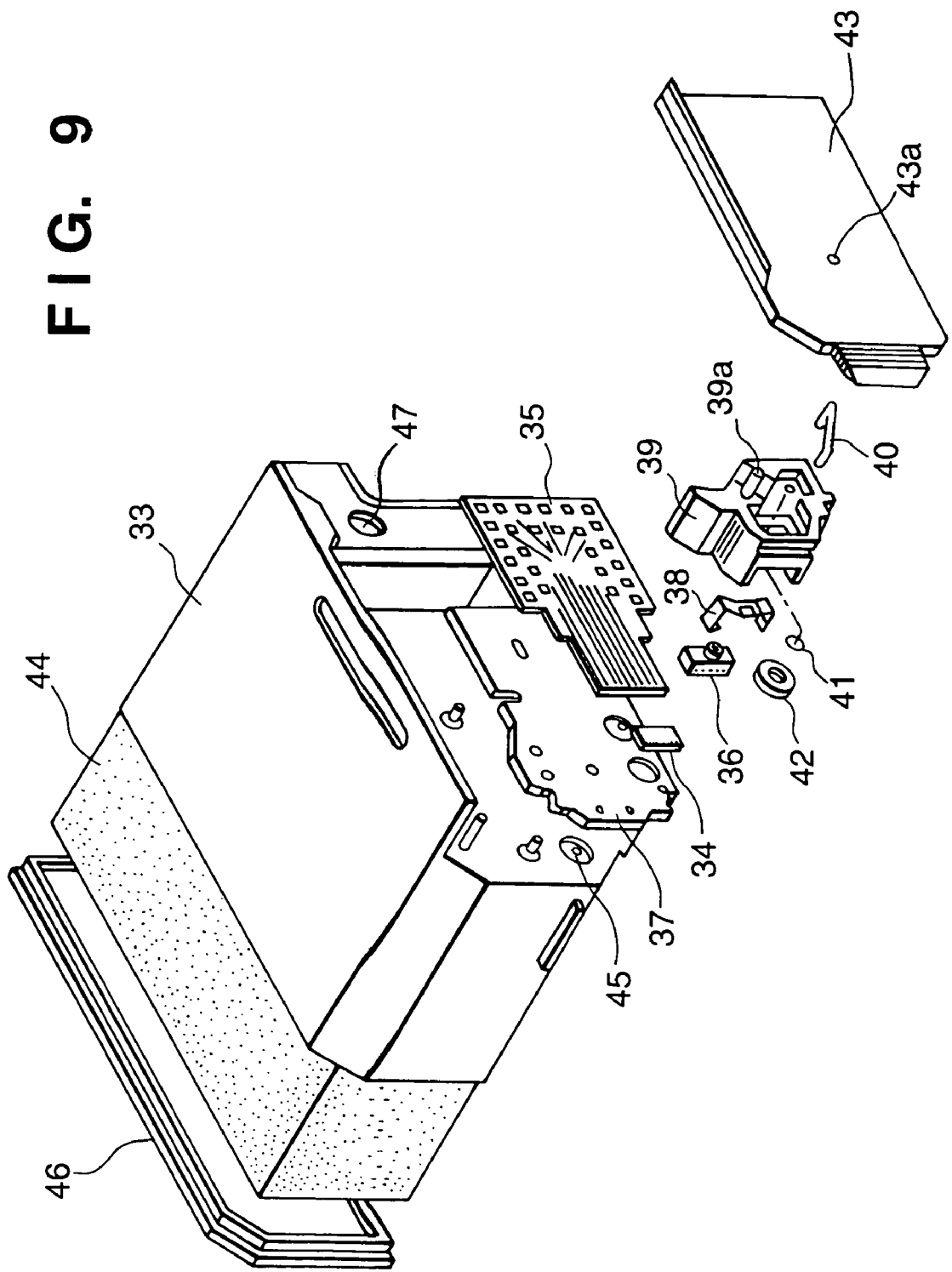
FIG. 9 is an exploded perspective view of the cartridge shown in FIG. 8.

FIG. 8 shows the external appearance of the cartridge as an object of this modification. FIG. 9 shows the exploded state of the cartridge. That is, a cartridge 31 of this modification is formed by integrating an inkjet printing head 32 for discharging ink by using thermal energy and an ink tank 33. This cartridge 31 is mounted to be replaceable in an inkjet printer of the above type.

The printing head 32 of this cartridge 31 has electrothermal transducers, formed on a substrate through the semiconductor fabrication processes such as etching, vapor deposition, and sputtering, electrodes, liquid channel walls, and a top plate.

A heater board 34 has a structure in which electrothermal transducer elements and aluminum lines for supplying power to these electrothermal transducer elements are formed by the film formation technology. Reference numeral 35 denotes a printed circuit board corresponding to the heater board 34, and corresponding lines are connected by, e.g., wire bonding. A top plate 36 has partitions for limiting ink flow channels and a common ink compartment. In this modification, this top plate 36 is formed using thermoplastic having an integrated discharge port plate.

Reference numeral 37 denotes a metal base plate; and 38, an SUS press spring. The base plate 37 and the press spring 38 are combined with the heater board 34 and the top plate 36 sandwiched between them. Consequently, the heater board 34 and the top plate 36 are fixed by pressure. The printed circuit board 35 is fixed by adhesion or the like to the base plate 37. This printed circuit board 35 also functions as a member for radiating heat, generated when ink is discharged, from the heater board 34.

A sub-tank 39 receives ink supplied from the ink tank 33 as an ink supply source and guides the ink to a common liquid compartment, formed by junction of the heater board 34 and the top plate 36, via a supply pipe 40 molded from plastic. An SUS filter 41 is placed in a portion of the sub-tank 39 close to a port for supplying ink to the common liquid compartment. This SUS filter 41 is attached by a filter fixing member 42 which is a plastic molded product. Reference numeral 43 denotes a cover plate whose pawl 43a is welded to a boss 39a formed on the sub-tank 39. This cover plate 43 is a plastic molded product. An ink holding member 44 to be impregnated with ink is made of a foamed polyurethane resin and placed in the ink tank 33. A supply port 45 supplies ink to a discharge unit including the components 34 to 43 described above. In the step before this discharge unit is placed in the ink tank 33, the ink holding member 44 can be impregnated with ink by injecting it from the supply port 45. Reference numeral 46 denotes a cover member of the ink tank 33; and 47, an air communicating port which allows the interior of the cartridge 35 to communicate with the air.

Ink as disclosed in Japanese Patent Publication No. 7-119378 is known as ink contained in the ink tank 33 of this cartridge 31. Ink containing pigments is also well known as well as ink containing dyes as coloring agents.

EXAMPLE 2

Figure 10:
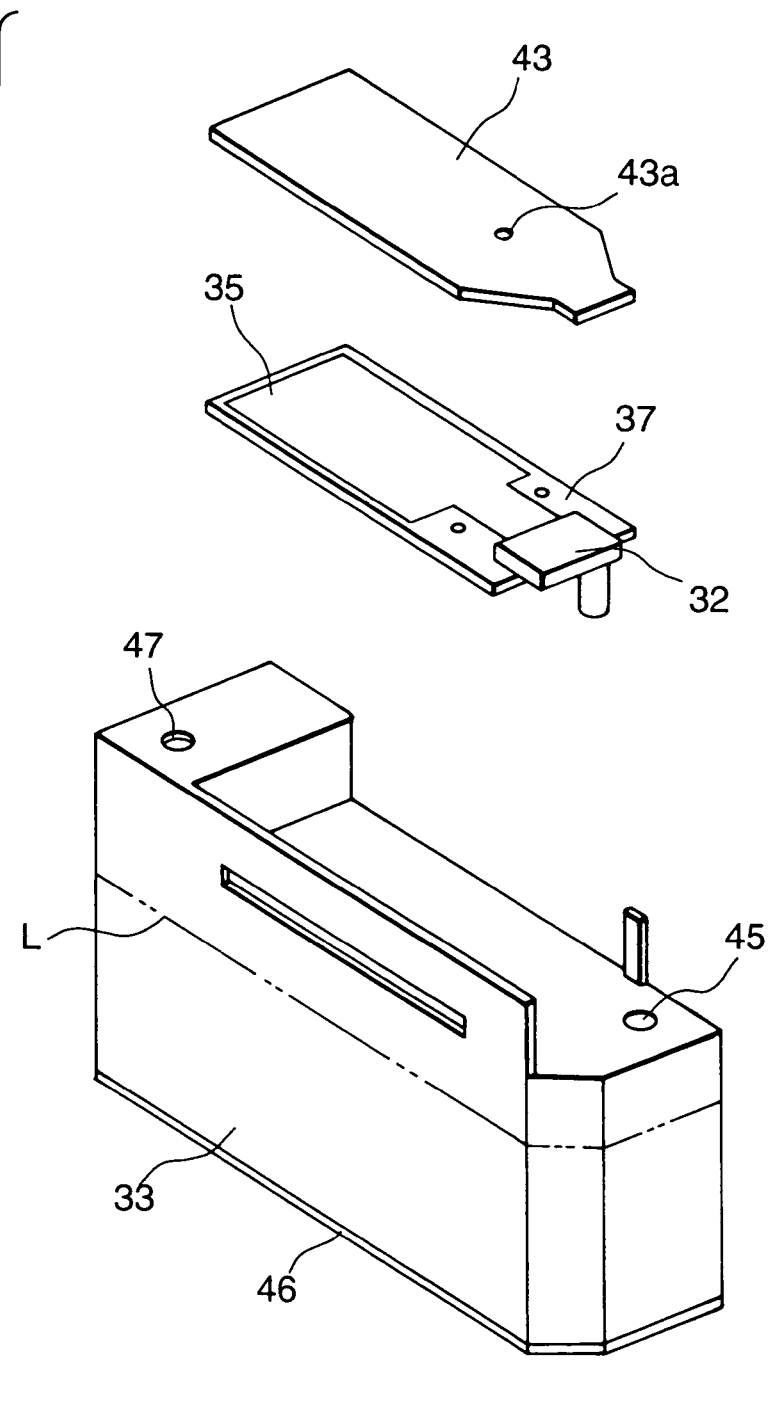
FIG. 10 is a view showing, together with FIG. 11, the concept of the work of recycling the cartridge shown in FIG. 8, in which the state wherein a printed circuit board and a cover plate are detached is depicted.
Figure 11:
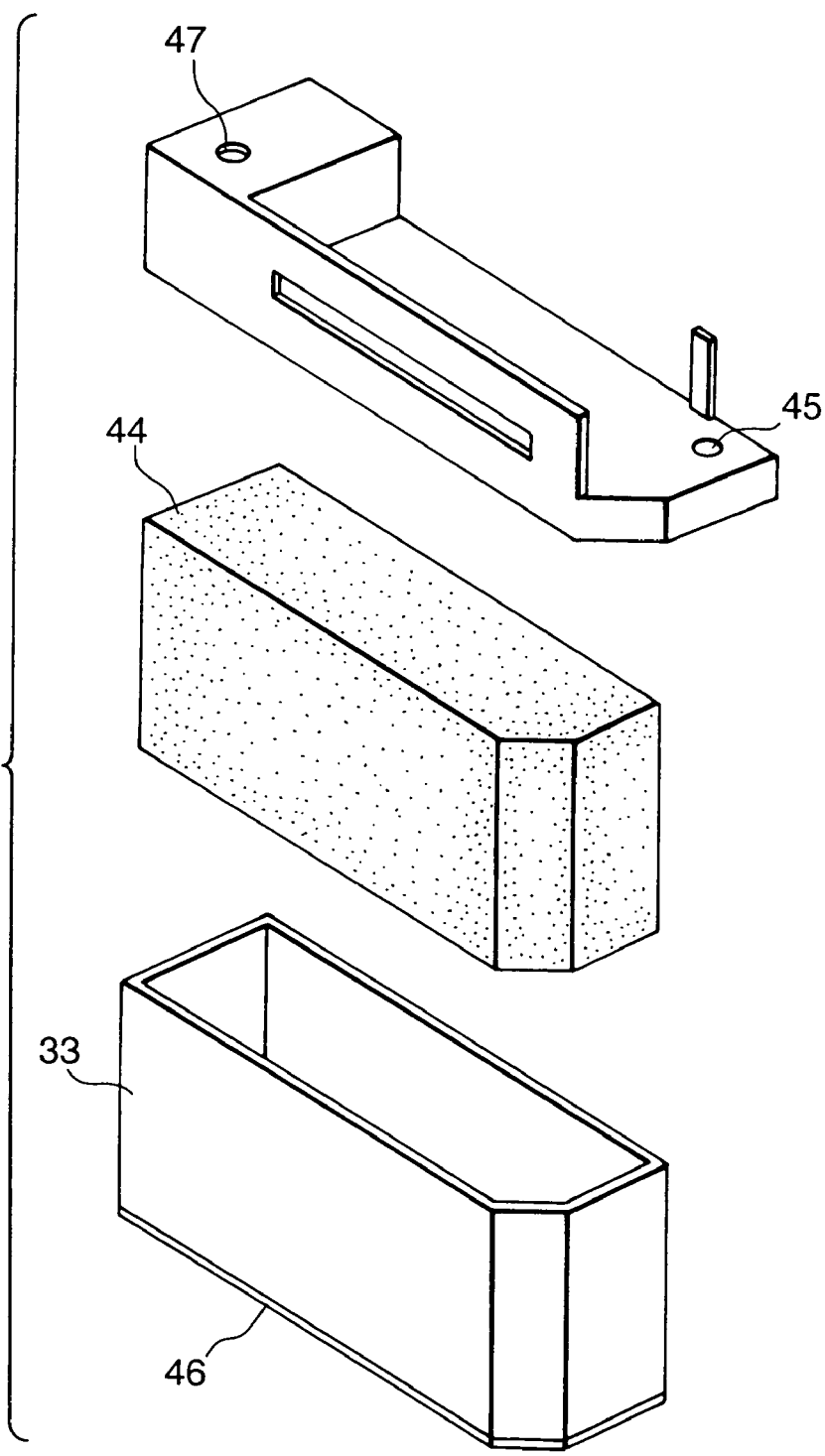
FIG. 11 is a view showing, together with FIG. 10, the concept of the work of recycling the cartridge shown in FIG. 8, in which the state wherein an ink tank is cut to remove an ink holding member is depicted.
Figure 12:
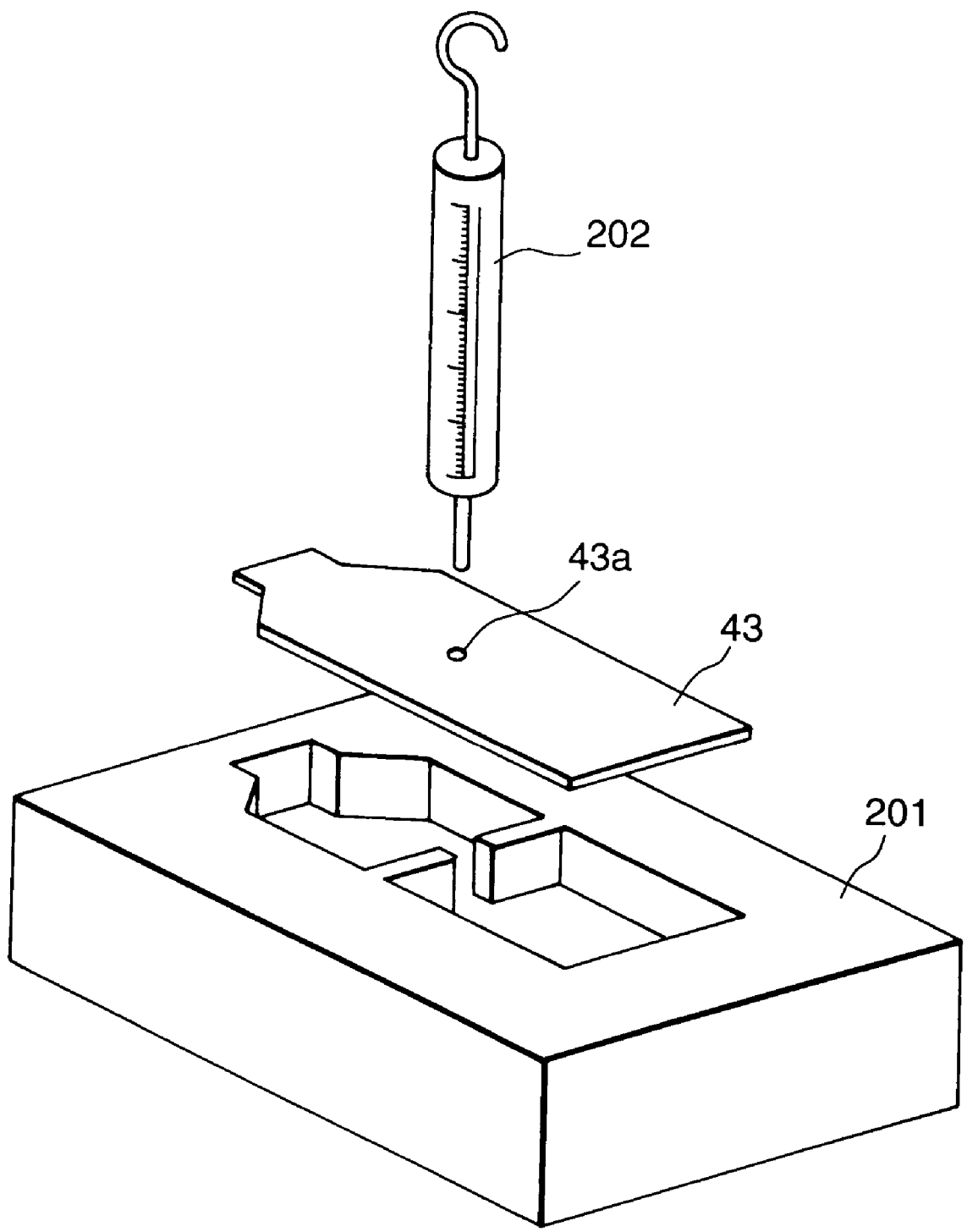
FIG. 12 is a view showing the concept of the work of conducting a breaking strength test on the cover plate shown in FIGS. 8 and 9 by using a push-pull gauge.

2,000 used cartridges 31 (BC-02: available from CANNON INC.) shown in FIGS. 8 and 9 were collected. As shown in FIG. 10, a cover plate 43, a printing head 32, a printed circuit board, and a base plate 37 were removed from an ink tank 33, and the ink tank 33 was cut from a cut line L indicated by the alternate long and two short dashed line. As shown in FIG. 11, an ink holding member 44 accommodated in the ink tank 33 was extracted. Consequently, about 30 kg of external members (material: PS-modified PPE, true density 1.08) of the ink tanks 33 were obtained as a recycling raw material. All of these plastic parts were manufactured by the same lot. The physical property values in the virgin pellet state before use were an Izod impact test value (based on ASTM-D256: sample size 2.5×0.5×0.25 (inch), with mold notch) of 90.2 J/m, and an MFR (based on ASTM-D1238: 250° C., load 98.07N) of 44 g/10 min. The measured physical property values are indicated by $R_2$ in FIG. 14.

Note that the color difference was calculated by a color difference expression based on JIS-K7105 from tristimulus values obtained in accordance with JIS-Z8722 condition D.

Of the materials constructing this cartridge 31, materials other than the external members are stainless steel for a filter 41 for preventing clogging of ink discharge ports, PP, PTFE, and glass; and various rubber materials and metals as sealing materials, a foamed urethane resin and a porous molded product as the ink holding member 44, and ink. Furthermore, materials constructing the printing head 32 are a glass epoxy substrate, an aluminum substrate, gold and copper as wiring materials, and super engineering plastic as a discharge port plate (not shown).

These used external members were pulverized by attaching an 8-mm mesh screen to the pulverizer 101 (VC-210: manufactured by Horai K.K.) shown in FIG. 4. Ink and its components adhered in an amount of 1,200 ppm on the average to this plastic pulverized product. Also, about 200 ppm of metals such as the SUS filters 41 and steel spheres (true density 7.9) constructing the cartridges 31, which were not completely separated out, and about 400 ppm of the ink holding members 44 (bulk density 0.041) as cut scraps were mixed (both were visually separated out and measured by the gravimetric method).

This pulverized product was cleaned and the cleaning solution was removed by using a cleaning•cleaning solution removing apparatus (HIGHCHIP CLEANER CFP-500:

manufactured by Toyo Seiki K.K.) The plastic supply rate was 2.5 kg/min., and the flow rate of the cleaning solution W (in this embodiment, tap water) was 80 liters/min. The weight ratio of the supply amount of the cleaning solution to the supply amount of the raw material per unit time was 32/1. The cleaning solution was received by the cleaning solution tank 110 having a capacity of 2,000 liters as shown in FIG. 5. Before being pumped up and reused, the cleaning solution was filtered by a filter housing (EBF112S6M: manufactured by Loffler K.K.) containing a nylon monofilament (R100NMO12M: manufactured by Loffler K.K.)

The cleaned pulverized product from which the cleaning solution was removed was supplied to an air-classification aspirator system (KF-12: manufactured by Horai K.K.) by the air blower 114 (DF-5: manufactured by Horai K.K.) and classified into the low-bulk-density ink holding members 44 and the other pulverized product.

The pulverized product passed through the air-classification aspirator system was dropped onto the magnetic separator 126 (MAGIC CATCH: manufactured by JMI K.K., residual magnetic flux density 1.3 tesla) to separate ferromagnetic components.

Subsequently, the pulverized product was conveyed to the stock tank 129 by the air blower 127 (DF-1: manufactured by Horai K.K.). This pulverized product was conveyed at a ratio of about 3 kg/min. from the stock tank 129 to an eddy current type metal detecting/removing apparatus (MDS-30A: manufactured by Sensor Technology K.K.), thereby removing metal components. The finally obtained cleaned pulverized material weighed 28 kg.

The amounts of moisture and ink sticking to the obtained cleaned pulverized material were measured by the gravimetric method and the colorimetric spectroscopy and found to be 0.1 wt % and 90 ppm, respectively. Also, residual metal components and foamed urethane resin were visually zero. This cleaned pulverized material alone was used to form five Izod impact testing samples (based on ASTM-D256: sample size 2.5×0.5×0.25 (inch), with mold notch). The average value of the Izod impact strengths measured was 89.2 J/m.

Color difference measurement was performed using Izod impact testing sample pieces molded from virgin pellets as a color difference standard with respect to the above sample pieces. The $\Delta E$ was found to be 0.43. Analogously, the MFR (based-on ASTM-D1238: 250° C., load 98.07N) was measured three times, and the average value was 42 g/10 min. The measured physical property values are indicated by $S_2$ in FIG. 14.

As shown in FIG. 14, the Izod impact value and the MFR reduced 1.1% and 4.5%, respectively, from $R_2$ to $S_2$. To give a recycled plastic material a performance equivalent to that of a virgin material, it is necessary to make the Izod impact strength 0.8 times or less and the MFR less than 1.2 times. The change rates of the above physical property values well satisfy the characteristics of a recycled plastic material.

The color difference was evaluated by taking account of color difference variations in the virgin pellet state. In the case of a PS-modified PPE resin, $\Delta E \leq 1.0$ was a target. Since $\Delta E$ was 0.43, this material can be used in the same manner as the virgin material.

The residual moisture was also 0.10 wt %, indicating that adverse effect on plastic caused by hydrolytic properties could be prevented. The residual ink amount was 90 ppm. From these results, the recycled plastic material manufactured by this embodiment is considered to be usable in the same manner as the virgin material.

To further confirm the characteristics, this cleaned pulverized material alone was used to mold 100 cover plates 43 of the cartridge 31. Separately, 100 identical comparative samples were molded from virgin pellets. 10 plates selected at random from each group were attached to a dedicated jig 201 shown in FIG. 12, and the breaking strength of a pawl 43*a* of the cover plate 43 was measured using a push-pull gauge 202. The results are indicated by $S_2$ in FIG. 15.

The breaking strength of the pawl 43*a* indicated by $S_1$ in FIG. 15 increased 3.1%. This demonstrates that both the bending strength and the toughness were equivalent to those of the virgin material.

COMPARATIVE EXAMPLE OF EXAMPLE 2

To confirm the effect of separation of solid matter (to be also referred to as foreign matter hereinafter) such as metals other than thermoplastic performed after cleaning, a raw material was recycled by the same recycling process as in the Example 2 except that neither air classification using the bulk density difference nor metal separation using eddy current were performed by turning off the air-classification aspirator system (KF-12: manufactured by Horai K.K.) and the eddy current type metal detecting/removing apparatus (MDS-30A: manufactured by Sensor Technology K.K.)

The weight of external members of the ink tanks 33 of the cartridges 31 supplied was about 30 kg, and the weight of a cleaned pulverized material obtained was 28 kg. The amount of metal components contained was 100 ppm (measured by the gravimetric method). The physical property values of this cleaned pulverized material were an Izod impact test value of 66.6 J/m, an MFR of 56 g/10 min., and a color difference $\Delta E$ of 0.60. The measured physical property values are indicated by $C_1$ in FIG. 14.

As shown in FIG. 14, from $R_2$ to $C_2$, the Izod impact value decreased 26.2%, and the MFR increased 27.3%; the Izod impact value exceeded 0.8 times, and the MFR was 1.2 times or more. The residual moisture was 0.25 wt %. Although this value is less than 0.30 wt %, the residual metal amount was as large as 100 ppm. Consequently, it was possible to confirm the effects of air classification and metal separation for a recycled plastic material having a performance equivalent to that of a virgin material.

EXAMPLE 3

Cleaning, cleaning solution removal, drying, and precision separation were performed following the same procedures as in the Example 2 except that a 6-mm mesh screen was used in pulverization and the plastic supply rate and the cleaning solution flow rate were set to 8 kg/min. and 80 liters/min., respectively, during cleaning. As a consequence, the cleaned pulverized material obtained weighed 27 kg.

The physical property values of this cleaned pulverized material were an Izod impact test value of 87.2 J/m, an MFR of 43 g/10 min., and a color difference $\Delta E$ of 0.49. These measured physical property values plus the residual moisture and the like are indicated by $S_3$ in FIG. 14.

As shown in FIG. 14, from $R_2$ to $S_3$, the Izod impact value decreased 3.3%, and the MFR increased 2.2%. As described previously, to give a recycled plastic material a performance equivalent to that of a virgin material, it is necessary to make the Izod impact strength 0.8 times or less and the MFR less than 1.2 times. The change rates of the above physical property values well satisfy the characteristics of a recycled plastic material.

The color difference $\Delta E$ was 0.49, and the residual moisture was 0.15 wt %; both values were satisfactory to obtain the performance equivalent to the virgin material. The residual ink amount was 150 ppm. However, when the other physical property values and color difference measured are taken into consideration, the quality of this material is considered to be equivalent to the virgin material.

To further confirm the characteristics, this cleaned pulverized material alone was used to mold 100 cover plates 43 of the cartridge 31. 10 plates selected at random from these 100 plates were attached to the dedicated jig 201, and the breaking strength of the pawl 43a of the cover plate 43 was measured using the push-pull gauge 202. The results are indicated by $S_3$ in FIG. 15.

The breaking strength of the pawl indicated in FIG. 15 increased 1.2%. This demonstrates that both the bending strength and the toughness were equivalent to those of the virgin material.

EXAMPLE 4

40 used inkjet printers (BJC-430: manufactured by CANNON INC.) shown in FIG. 6 were collected to obtain about 40 kg of external members (all made from an ABS resin: true density 1.05) including front covers 17, rear covers 18, and operation covers 19. A nameplate adhered to the front surface of each operation cover 19 and rubber legs projecting from the bottom surface of each rear cover 18 were removed in advance.

The physical property values in the virgin pellet state of the ABS resin used were an Izod impact test value (based on ASTM-D256: with ⅛-inch notch) of 157.8 J/m, and an MFR (based on JIS-K7210: 220° C., load 98.07N) of 40.7 g/10 min. A maximum of about 700 ppm of ink and its components adhered to this plastic pulverized product (the amount of the adhered ink and its components was measured by the calorimetric spectroscopy). Also, metals or ink holding members not completely separated were not found by visual checking. The measured physical property values are indicated by R in FIG. 16.

Note that the color difference was calculated by a color difference expression based on JIS-K7105 from tristimulus values obtained in accordance with JIS-Z8722 condition D.

These used external members were pulverized by attaching a 6-mm mesh screen to the pulverizer 101 (JC-10: manufactured by Morita Seiki K.K.) shown in FIG. 4.

This pulverized product was cleaned and the cleaning solution was removed by using a cleaning•cleaning solution removing apparatus (HIGHCHIP CLEANER CFP-500: manufactured by Toyo Seiki K.K.) The plastic supply rate was 2.5 kg/min., and the flow rate of the cleaning solution W (in this embodiment, tap water) was 80 liters/min. The cleaning solution was received by the cleaning solution tank 110 having a capacity of 2,000 liters as shown in FIG. 5. Before being pumped up and reused, the cleaning solution was filtered by a filter housing (EBF112S6M: manufactured by Loffler K.K.) containing a nylon monofilament (R100NMO12M bug filter: manufactured by Loffler K.K., filtering accuracy 100 μm)

The cleaned pulverized product from which the cleaning solution was removed was supplied to an air-classification aspirator system (KF-12: manufactured by Horai K.K.) by the air blower 114 (DF-5: manufactured by Horai K.K.) and classified into low-bulk-density foreign matter such as foamed urethane resin and the other pulverized product.

The pulverized product passed through the air-classification aspirator system was dropped onto the magnetic separator 126 (MAGIC CATCH: manufactured by JMI K.K., residual magnetic flux density 1.3 tesla) to separate ferromagnetic metals.

Subsequently, the pulverized product was conveyed to the stock tank 129 by the air blower 127 (DF-1: manufactured by Horai K.K.). This pulverized product was conveyed at a ratio of about 3 kg/min. from the stock tank 129 to an eddy current type metal detecting/removing apparatus (MDS-30A: manufactured by Sensor Technology K.K.), thereby removing metal components. The finally obtained cleaned pulverized material weighed 38 kg.

The amounts of moisture and ink sticking to the obtained cleaned pulverized material were measured by the gravimetric method and the calorimetric spectroscopy and found to be 0.11 wt % and 10 ppm, respectively. Also, residual metal components were visually zero.

The physical property values of this cleaned pulverized material measured under the same conditions as virgin pellets were an Izod impact value of 145.0 J/m, an MFR of 42.0 g/10 min., and a color difference ΔE of 0.35. These physical property values measured are indicated by $S_1$ in FIG. 16.

As shown in FIG. 16, from $R_4$ to $S_4$, the Izod impact value decreased 8.1%, and the MFR increased 3.2%. To give a recycled plastic material a performance equivalent to that of a virgin material, it is necessary to make the Izod impact strength 0.8 times or less and the MFR less than 1.2 times. From this viewpoint, the change rates of the above physical property values well satisfy the characteristics of a recycled plastic material.

The color difference was evaluated by taking account of color difference variations in the virgin pellet state. In the case of an ABS resin, ΔE≦1.0 was a target. Since the color difference ΔE obtained was 0.35, this material was found to be usable in the same manner as the virgin material.

The residual moisture was also 0.11 wt %, indicating that adverse effect on plastic caused by hydrolytic properties could be prevented. The residual ink amount was 10 ppm. From these results, the recycled plastic material manufactured by this embodiment was found to have quality equivalent to that of the virgin material.

An inkjet printer 11 (BJF-600: available from CANNON INC.) shown in FIGS. 1 and 2 is currently produced and sold by forming all of its plastic parts by using virgin materials. This inkjet printer 11 was manufactured using the cleaned pulverized material obtained through the above recycling process. More specifically, the cleaned pulverized material was applied to an upper case 12 (average thickness 2 mm, weight 389 g), a lower case 13 (average thickness 2 mm, weight 545 g), and an operation cover 14 (average thickness 2.3 mm, weight 159 g). Consequently, no visual difference was found between the external appearance and color (hue, saturation, and lightness) of each of these three parts 12 to 14 and a corresponding part manufactured using the virgin material.

COMPARATIVE EXAMPLE OF EXAMPLE 4

A material was recycled following the same procedures as in the Example 4 except that the plastic supply rate and the cleaning solution flow rate of the cleaning•cleaning solution removing apparatus (corresponding to 110 and 113 in FIG. 4) were changed to 2 kg and 10 liters/min., respectively. The obtained cleaned pulverized material weighed 27 kg.

The physical property values of this cleaned pulverized material measured under the same conditions as virgin pellets were an Izod impact value of 121.5 J/m, an MFR of 45 g/10 min., and a color difference ΔE of 1.03. These measured physical property values plus the residual moisture content and the like are indicated by $C_1$ in FIG. 16.

As shown in FIG. 16, from $R_V$ to $C_1$, the Izod impact value decreased 23.0%, and the MFR increased 10.6%. As described previously, to give a recycled plastic material a performance equivalent to that of a virgin material, it is necessary to make the Izod impact strength 0.8 times or less and the MFR less than 1.2 times. The recycled plastic material obtained by changing the weight ratio of the cleaning solution to the pulverized material did not satisfy the necessary characteristics.

Also, the color difference ΔE was 1.03, larger than the critical value of 1.0, the residual moisture content was 0.55 wt %, and the residual ink amount was 340 ppm. These values and the other characteristic values measured indicate that the quality degraded compared to the virgin material.

COMPARATIVE EXAMPLE 2 OF EXAMPLE 4

A material was recycled following the same procedures as in the Example 4 except that the filtration accuracy of a filter for a cleaning solution was changed to 250 μm.

The physical property values of this cleaned pulverized material measured under the same conditions as virgin pellets were an Izod impact value of 117.7 J/m, an MFR of 52 g/10 min., and a color difference ΔE of 1.16. These measured physical property values are indicated by $C_1$ in FIG. 16.

As shown in FIG. 16, from $R_V$ to $C_1$, the Izod impact value decreased 25.4%, and the MFR increased 27.7%. As described previously, to give a recycled plastic material a performance equivalent to that of a virgin material, it is necessary to make the Izod impact strength 0.8 times or less and the MFR less than 1.2 times. The recycled plastic material obtained by changing the filtration accuracy of the filter to 250 μm did not satisfy the necessary characteristics.

Also, the color difference ΔE was 1.16, larger than the critical value of 1.0. This indicates that the quality degraded compared to the virgin material.

EXAMPLE 5

In each of the above embodiments, the recycled plastic material obtained by performing the recycling process of a plastic material according to the embodiment once had physical property values equivalent to those of the virgin material. In this Example 5, physical properties when the recycling process was performed a plurality of times will be explained.

Thermoplastic (ABS resin, true density: 1.05) was recycled by the same process as in the Example 4. The physical property values of virgin pellets are indicated by $R_5$ in FIG. 17. Also, the physical property values of a recycled plastic material (to be referred to as a "one-time recycled material" hereinafter) formed by repelletizing the cleaned pulverized material obtained by performing the same recycling process as in the Example 4 one time are indicated by $S_{51}$ in FIG. 17.

The physical property values of a recycled plastic material (to be referred to as a "two-time recycled material" hereinafter) obtained by repelletizing the one-time recycled material thus obtained are indicated by $S_{51}$ in FIG. 17. Also, the physical property values of a three-time recycled material and a five-time recycled material obtained by similarly repeating the recycling process are indicated by $S_{51}$ and $S_{55}$, respectively, in FIG. 17.

As shown in FIG. 17, both the Izod impact value and the MFR of the one-time recycled material obtained by performing the recycling process according to the present invention decreased 2.3% compared to the virgin material ($R_5$). Also, the color difference was 0.22. These values can be regarded as equivalent to those in the Example 4. That is, the one-time recycled material was found to be usable in the same manner as the virgin material.

Likewise, lowering (deterioration) of the physical property values of the two-, three-, and five-time recycled materials with respect to the virgin material ($R_5$) was most significant in $S_{55}$; the Izod impact value decreased 7.2%, the MFR increased 2.3%, and the lowering of the color difference was 0.51.

In the present invention, the definition of a recycled plastic material having a performance equivalent to a virgin material is that the Izod impact strength is 0.8 times or less, the MFR value is less than 1.2 times, and the color difference is 1.0 or less. When this definition is taken into consideration, each physical property value shows that this recycled plastic material can be used in the same manner as the virgin material.

The Rockwell hardness of each recycled material was substantially the same value as the virgin material. This physical property value also indicates that the physical property values of these recycled plastic materials fell in the ranges of prescribed values.

That is, the present invention is effective even when the recycling process is performed a plurality of times.

In the present invention, laser-engraved thermoplastic is used as the raw material of a recycled plastic material. Therefore, the recycling process of this recycled plastic material does not require any label peeling step. Also, since no paint such as used in silk screen printing sticks to the material, the recycling process can be simplified, and deterioration of the hue of the obtained recycled plastic material can be prevented.

Furthermore, an electronic apparatus having laser-engraved thermoplastic parts is disassembled, and thermoplastic parts of an identical electronic apparatus are molded using thermoplastic obtained from the thermoplastic parts of the disassembled electronic apparatus as a raw material. This allows ideal recycling to be performed.

Since thermoplastic containing metals is used as the raw material of a recycled plastic material, not only the metals contained in the thermoplastic as the raw material but also most metal pieces which can be mixed when the raw material is pulverized during the recycling process can be easily removed. Therefore, contamination is very little, so recycled plastic having high external appearance quality can be obtained.

When thermoplastic used in an inkjet apparatus or thermoplastic to which an ink or its composition adheres is used as the raw material of a recycled plastic material, this thermoplastic can be directly reused as thermoplastic parts of the original inkjet apparatus.

Since an electronic apparatus is constituted by using the recycled plastic material described above, the use and spread of this recycled plastic material can be further promoted.

When a cleaning solution after thermoplastic is cleaned is filtered through a filter having a mesh within the range of 25 to 200 μm and the filtered cleaning solution is reused, the problem of the physical properties of the obtained recycled plastic material and the problem of clogging of the filter can be solved at the same time.

When a cleaning solution contains at least one of an additive for adjusting the pH concentration and a surfactant, the cleaning effect can be obtained within a short time.

When water is used as a cleaning solution and this water used in cleaning is filtered and reused, the economical efficiency and the safety of work can be increased compared to the case in which an aqueous cleaner containing an organic solvent, surfactant, and builder is used. Additionally, the load on environment can be minimized by repetitively reusing the cleaning solution.

When a cleaning solution after cleaning is to be reused, not only foreign matter removal using a filter but also pH concentration adjustment are combined into one system. This improves the cleanness of the cleaning solution when it is reused and reduces the environmental load.

By limiting the amount of adhesion of an ink or an ink components to a recycled plastic material to less than 300 ppm, the color of the recycled plastic material can be made equal to that when a virgin material is used.

Letting $I_R$ and $M_R$ be the Izod impact value and the melt flow rate, respectively, of a recycled plastic material and $I_V$ and $M_V$ be the Izod impact value and the melt flow rate, respectively, of a thermoplastic virgin material before molding, the quality of this recycled plastic material can be kept substantially equal to that of the virgin material if $(I_R/I_V)>0.8$ and $(M_R/M_V)<1.2$.

When external parts of an electronic apparatus are formed by a recycled plastic material, the product value of the external appearance does not degrade even with the use of the recycled plastic material, as well as the physical property values of the material are maintained. This greatly widens the application of the recycled material unlike in conventional thermal recycle or cascade recycle.

Furthermore, ideal recycling can be performed because thermoplastic obtained from thermoplastic parts of an ink container used in an inkjet apparatus is used as a raw material and thermoplastic parts of an identical inkjet apparatus are molded using this raw material.

The present invention is not limited to the above embodiments and various changes and modifications can be made within the spirit and scope of the present invention. Therefore, to apprise the public of the scope of the present invention the following claims are made.

What is claimed is:

1. A method of manufacturing a recycled plastic material comprising the steps of:
   pulverizing a part molded from a thermoplastic material to which ink and components of the ink have stuck;
   cleaning the pulverized material;
   dehydrating the pulverized material cleaned in said cleaning step;
   removing solid matter other than the thermoplastic material from the pulverized material dehydrated in said dehydrating step; and
   forming a recycled raw material by melting and kneading the pulverized material from which the solid matter other than the thermoplastic material has been removed in said removing step,
   wherein the pulverized material is cleaned so that an amount of ink and components of the ink sticking to the pulverized material fall within a range of a predetermined value in said cleaning step and the pulverized material is dehydrated so that an amount of a moisture content falls within a range of a predetermined value in said dehydrating step, thereby an impact strength and a melt flow rate (MFR) of the recycled raw material are adjusted within the ranges of predetermined values in said forming step.

2. The method according to claim 1, wherein the impact strength of the recycled raw material is not less than 80% of the impact strength of the virgin material of the thermoplastic material and the melt flow rate of the recycled raw material is equal to or more than 90% and equal to or less than 120% of the melt flow rate the virgin material.

3. The method according to claim 1, wherein the amount of ink and components of the ink sticking to the pulverized material is less than 300 ppm.

4. The method according to claim 1, wherein the amount of the moisture content is 0.3 wt % or less.

5. The method according to claim 1, wherein the part molded from a thermoplastic material is an ink container.

6. A method of manufacturing a recycled plastic material comprising the steps of:
   pulverizing a part of a thermoplastic material to which ink and components of the ink have stuck;
   cleaning the pulverized material;
   dehydrating the pulverized material cleaned in said cleaning step; and
   forming a recycled raw material by melting the pulverized material dehydrated in said dehydrating step,
   wherein the pulverized material is cleaned so that an amount of ink and components of the ink sticking to the pulverized material fall within a range of a predetermined value in said cleaning step and the pulverized material is dehydrated so that an amount of a moisture content falls within a range of a predetermined value in said dehydrating step, thereby an impact strength and a melt flow rate (MFR) of the recycled raw material fall within the ranges of predetermined values in said forming step.

7. A method of manufacturing a recycled plastic material comprising the steps of:
   pulverizing a part of a thermoplastic material to which ink and components of the ink have stuck;
   cleaning the pulverized material;
   dehydrating the pulverized material cleaned in said cleaning step; and
   forming a recycled raw material by melting the pulverized material dehydrated in said dehydrating step,
   wherein the pulverized material is cleaned so that an amount of ink and components of the ink sticking to the pulverized material fall within a range which is less than 300 ppm in said cleaning step, and the pulverized material is dehydrated so that an amount of a moisture content falls within a range which is not more than 0.3 wt % in said dehydrating step.

* * * * *